US012485668B2

(12) United States Patent
Aimono

(10) Patent No.: US 12,485,668 B2
(45) Date of Patent: Dec. 2, 2025

(54) LIQUID EJECTING APPARATUS

(71) Applicant: SEIKO EPSON CORPORATION, Tokyo (JP)

(72) Inventor: Takanori Aimono, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 202 days.

(21) Appl. No.: 18/177,595

(22) Filed: Mar. 2, 2023

(65) Prior Publication Data

US 2023/0278334 A1 Sep. 7, 2023

(30) Foreign Application Priority Data

Mar. 3, 2022 (JP) ................................ 2022-032352

(51) Int. Cl.
*B41J 2/045* (2006.01)
*B41J 2/135* (2006.01)

(52) U.S. Cl.
CPC ....... *B41J 2/04568* (2013.01); *B41J 2/04551* (2013.01); *B41J 2/0458* (2013.01); *B41J 2/04581* (2013.01); *B41J 2/135* (2013.01)

(58) Field of Classification Search
CPC ................ B41J 2/04501; B41J 2/04551; B41J 2/04568; B41J 2/04581; B41J 2/135
See application file for complete search history.

(56) References Cited

U.S. PATENT DOCUMENTS

2019/0283421 A1* 9/2019 Miyazawa ........... B41J 2/14233
2020/0207083 A1* 7/2020 Ozawa ................. B41J 2/04588
2021/0197565 A1* 7/2021 Tanaka ................. B41J 2/04581

FOREIGN PATENT DOCUMENTS

JP 2019-155768 A 9/2019

* cited by examiner

*Primary Examiner* — Douglas X Rodriguez
*Assistant Examiner* — Kendrick X Liu
(74) *Attorney, Agent, or Firm* — WORKMAN NYDEGGER

(57) ABSTRACT

A liquid ejecting apparatus includes a nozzle for ejecting a liquid, first to fourth pressure chambers communicating with the nozzle, first to fourth driving elements provided corresponding to each of the first to fourth pressure chambers, and a control section that controls the first to fourth driving elements. The control section is capable of executing a first ejection mode in which all of the first to fourth driving elements are driven to eject a liquid from the nozzle, and a second ejection mode in which only some driving elements among the first to fourth driving elements are driven to eject a liquid from the nozzle.

17 Claims, 23 Drawing Sheets

FIG. 9

| Mode | ID | Ncav | S1 | S2 | S3 | S4 | Iv [pl] |
|---|---|---|---|---|---|---|---|
| EM1 | 1_4_1 | 4 | ON | ON | ON | ON | 12 |
| EM2 | 2_3_1 | 3 | ON | ON | OFF | ON | 8 |
| | 2_3_2 | | ON | ON | ON | OFF | 7.5 |
| | 2_2_1 | 2 | ON | OFF | OFF | ON | 5 |
| | 2_2_2 | | OFF | ON | ON | OFF | 4.5 |
| | 2_2_3 | | ON | OFF | ON | OFF | 4 |
| | 2_2_4 | | OFF | ON | OFF | ON | 4 |
| | 2_2_5 | | ON | ON | OFF | OFF | 3.5 |
| | 2_2_6 | | OFF | OFF | ON | ON | 3.5 |
| | 2_1_1 | 1 | ON | OFF | OFF | OFF | 1 |
| | 2_1_2 | | OFF | ON | OFF | OFF | 0.5 |

FIG. 11

| Mode | ID | Ncav | S1 | S2 | S3 | S4 | Iv [pl] |
|---|---|---|---|---|---|---|---|
| EM1 | 1_4_1 | 4 | ON | ON | ON | ON | 12 |
| EM2 | 2_3_1 | 3 | ON | ON | OFF | ON | 8 |
| | 2_3_2 | | ON | ON | ON | OFF | 8 |
| | 2_2_1 | 2 | ON | OFF | OFF | ON | 5 |
| | 2_2_2 | | OFF | ON | ON | OFF | 5 |
| | 2_2_3 | | ON | OFF | ON | OFF | 4.5 |
| | 2_2_4 | | OFF | ON | OFF | ON | 4.5 |
| | 2_2_5 | | ON | ON | OFF | OFF | 4 |
| | 2_2_6 | | OFF | OFF | ON | ON | 4 |
| | 2_1_1 | 1 | ON | OFF | OFF | OFF | 1 |
| | 2_1_2 | | OFF | ON | OFF | OFF | 1 |

FIG. 19

| Mode | ID | Ncav | S1 | S2 | S3 | S4 | S5 | S6 | Iv [pl] |
|---|---|---|---|---|---|---|---|---|---|
| EM1 | 1_6_1 | 6 | ON | ON | ON | ON | ON | ON | 12 |
| EM2 | 2_5_1 | 5 | ON | ON | ON | ON | ON | OFF | 10 |
| | 2_4_1 | 4 | ON | ON | OFF | OFF | ON | ON | 8.5 |
| | 2_4_2 | | ON | OFF | ON | ON | OFF | ON | 8 |
| | 2_4_3 | | OFF | ON | ON | ON | ON | OFF | 7.5 |
| | 2_3_1 | 3 | ON | OFF | ON | OFF | ON | OFF | 6 |
| | 2_3_2 | | OFF | ON | OFF | ON | OFF | ON | 6 |
| | 2_2_1 | 2 | OFF | ON | OFF | OFF | ON | OFF | 4 |
| | 2_2_2 | | ON | OFF | OFF | OFF | OFF | ON | 3.5 |
| | 2_2_3 | | OFF | OFF | ON | ON | OFF | OFF | 3 |
| | 2_1_1 | 1 | ON | OFF | OFF | OFF | OFF | OFF | 0.5 |

FIG. 21

| Mode | ID | Ncav | S1 | S2 | S3 | S4 | S5 | S6 | Iv [pl] |
|---|---|---|---|---|---|---|---|---|---|
| EM1 | 1_6_1 | 6 | ON | ON | ON | ON | ON | ON | 12 |
| EM2 | 2_5_1 | 5 | ON | ON | ON | ON | ON | OFF | 10 |
| | 2_4_1 | 4 | ON | ON | OFF | OFF | ON | ON | 9 |
| | 2_4_2 | | ON | OFF | ON | ON | OFF | ON | 8 |
| | 2_4_3 | | OFF | ON | ON | ON | ON | OFF | 9 |
| | 2_3_1 | 3 | ON | OFF | ON | OFF | ON | OFF | 6 |
| | 2_3_2 | | OFF | ON | OFF | ON | OFF | ON | 6 |
| | 2_2_1 | 2 | OFF | ON | OFF | OFF | ON | OFF | 4 |
| | 2_2_2 | | ON | OFF | OFF | OFF | OFF | ON | 3.5 |
| | 2_2_3 | | OFF | OFF | ON | ON | OFF | OFF | 3.5 |
| | 2_1_1 | 1 | ON | OFF | OFF | OFF | OFF | OFF | 0.5 |

FIG. 23

| Mode | ID | Ncav | S1 | S2 | Iv [pl] |
|---|---|---|---|---|---|
| EM1 | 1_2_1 | 2 | ON | ON | 6 |
| EM2 | 2_1_1 | 1 | ON | OFF | 3.5 |
| | 2_1_2 | | OFF | ON | 2.5 |

LIQUID EJECTING APPARATUS

The present application is based on, and claims priority from JP Application Serial Number 2022-032352, filed Mar. 3, 2022, the disclosure of which is hereby incorporated by reference herein in its entirety.

BACKGROUND

1. Technical Field

The present disclosure relates to a liquid ejecting apparatus.

2. Related Art

JP-A-2019-155768 discloses a liquid ejecting head in which four pressure chambers are provided on both sides of a nozzle, and flow paths from each of the four pressure chambers to the nozzle are joined near the nozzle.

However, in the related art, a drive control when a liquid ejecting head that ejects a liquid from one nozzle using a plurality of pressure chambers is used was not sufficiently considered.

SUMMARY

A liquid ejecting apparatus according to a first aspect of the present disclosure includes a nozzle for ejecting a liquid, first to fourth pressure chambers communicating with the nozzle, first to fourth driving elements provided corresponding to each of the first to fourth pressure chambers, and a control section that controls the first to fourth driving elements. The control section is configured to execute a first ejection mode in which all of the first to fourth driving elements are driven to eject a liquid from the nozzle, and a second ejection mode in which only some driving elements among the first to fourth driving elements are driven to eject a liquid from the nozzle.

A liquid ejecting apparatus according to a second aspect of the present disclosure includes a nozzle for ejecting a liquid, a plurality of pressure chambers communicating with the nozzle, a plurality of driving elements provided corresponding to each of the plurality of pressure chambers, and a control section that controls the plurality of driving elements. The control section is configured to execute a first ejection mode in which all of the plurality of driving elements are driven to eject a liquid from the nozzle, and a second ejection mode in which only some driving elements among the plurality of driving elements are driven to eject a liquid from the nozzle.

BRIEF DESCRIPTION OF THE DRAWINGS

FIG. 9 is an explanatory diagram illustrating an ejection mode according to the first embodiment.

FIG. 11 is an explanatory diagram illustrating an ejection mode according to the second embodiment.

FIG. 19 is an explanatory diagram illustrating an ejection mode according to the fourth embodiment.

FIG. 21 is an explanatory diagram illustrating an ejection mode according to the fifth embodiment.

FIG. 23 is an explanatory diagram illustrating an ejection mode according to the sixth embodiment.

DESCRIPTION OF EXEMPLARY EMBODIMENTS

A. Configuration of First Embodiment

Figure 1:
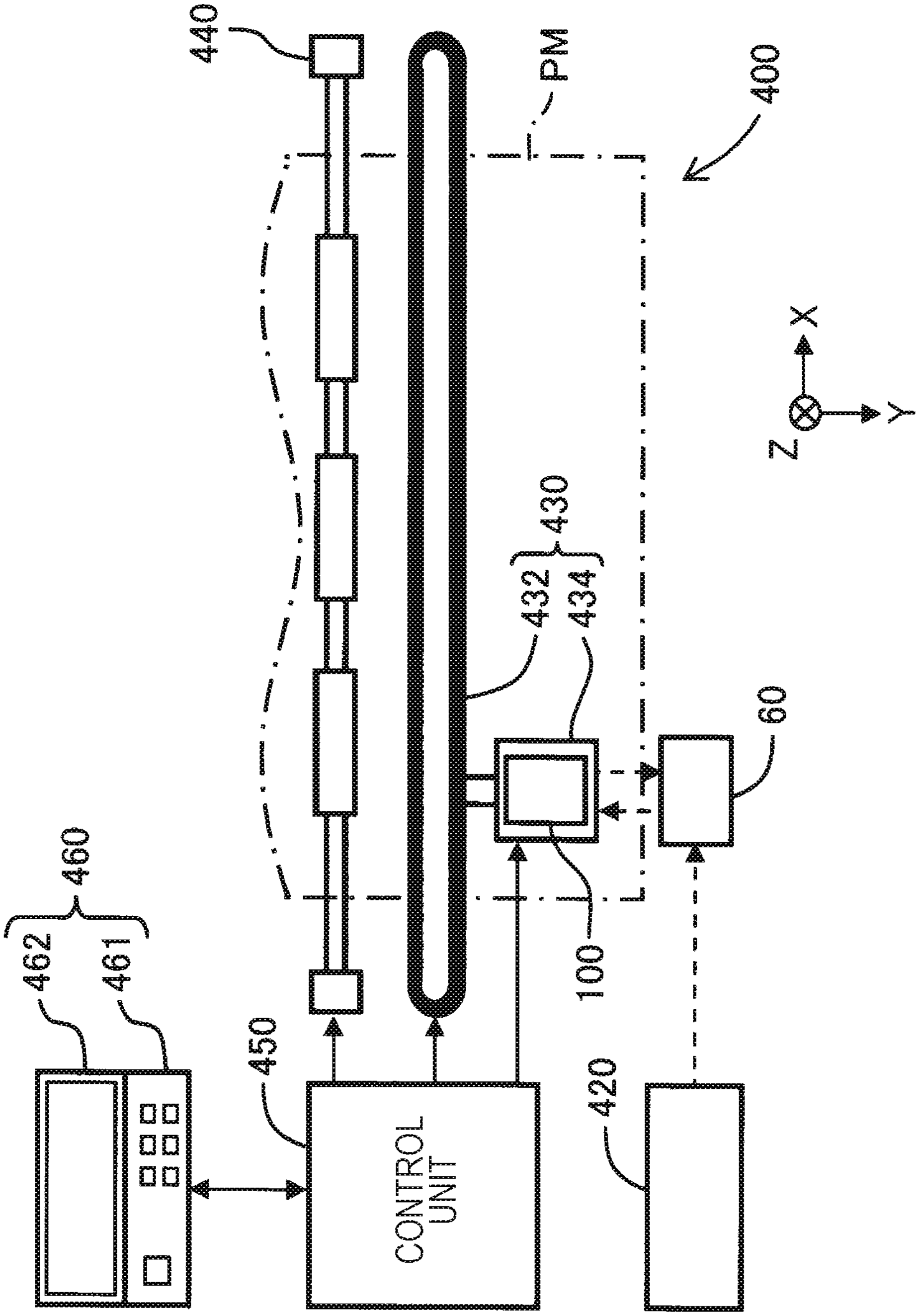
FIG. 1 is an explanatory diagram illustrating a configuration of a liquid ejecting apparatus according to an embodiment.

FIG. 1 is an explanatory diagram illustrating a configuration of a liquid ejecting apparatus 400 according to an embodiment. The liquid ejecting apparatus 400 is an ink jet type printing apparatus that ejects ink, which is an example of a liquid, onto a medium PM. The composition of the ink is not particularly limited. For example, the ink may be a water-based ink in which a coloring material such as a dye or pigment is dissolved in a water-based solvent, a solvent-based ink in which a coloring material is dissolved in an organic solvent, or an ultraviolet curable type ink. In addition, the liquid ejecting apparatus 400 may eject paint as a liquid instead of ink. A liquid storage section 420 for storing ink can be attached to the liquid ejecting apparatus 400. The liquid ejecting apparatus 400 executes printing by ejecting the ink in the liquid storage section 420 toward the medium PM. The liquid ejecting apparatus 400 includes a liquid ejecting head 100, a moving mechanism 430, a transport mechanism 440, a control section 450, an input receiving section 460, and a circulation mechanism 60.

The liquid ejecting head 100 includes a plurality of nozzles 200 and ejects liquid ink supplied from the liquid storage section 420 from the plurality of nozzles 200. Specific examples of the liquid storage section 420 include a container such as a cartridge that is attachable to and detachable from the liquid ejecting apparatus 400, a bag-shaped ink pack formed of a flexible film, and an ink tank that can be refilled with ink. Ink ejected from the nozzle 200 lands on the medium PM. The medium PM is typically a printing paper sheet. The medium PM is not limited to a printing paper sheet, and may be, for example, a printing target of any material such as a resin film or cloth.

The moving mechanism 430 includes a ring-shaped belt 432 and a carriage 434 fixed to the belt 432. The carriage 434 holds the liquid ejecting head 100. The moving mechanism 430 can reciprocate the liquid ejecting head 100 in the X direction by rotating the ring-shaped belt 432 in both directions.

The transport mechanism 440 transports the medium PM in the Y direction between movements of the liquid ejecting head 100 by the moving mechanism 430. The Y direction is a direction orthogonal to the X direction. In this embodiment, the X direction and the Y direction are horizontal directions. The Z direction is a direction intersecting the X direction and the Y direction. In this embodiment, the Z direction is vertically downward. The liquid ejecting head 100 ejects ink in the Z direction while being transported in the X direction. The Z direction is also referred to as "ejection direction Z". In the following description, the tip end side of the arrow indicating the X direction in the drawing is referred to as the +X side, and the base end side is referred to as the −X side. The tip end side of the arrow indicating the Y direction in the drawing is referred to as the +Y side, and the base end side is referred to as the −Y side. The tip end side of the arrow indicating the Z direction in the drawing is referred to as the +Z side, and the base end side is referred to as the −Z side.

The control section 450 controls the operation of ejecting ink from the liquid ejecting head 100. The control section 450 controls the transport mechanism 440, the moving mechanism 430, and the liquid ejecting head 100 to form an image on the medium PM.

The input receiving section 460 includes an input section 461 and an output section 462. The input section 461 receives from the user an instruction to execute printing, and an instruction of various settings such as a gap setting between the nozzle 200 of the liquid ejecting head 100 and the medium PM, and a setting of a liquid ejection mode. The output section 462 displays setting screens for various functions that can be executed by the liquid ejecting apparatus 400. In this embodiment, the input receiving section 460 is an operation panel, and is coupled to the control section 450 such that data can be transmitted and received. In addition, the input receiving section 460 may be an external computer.

Figure 2:
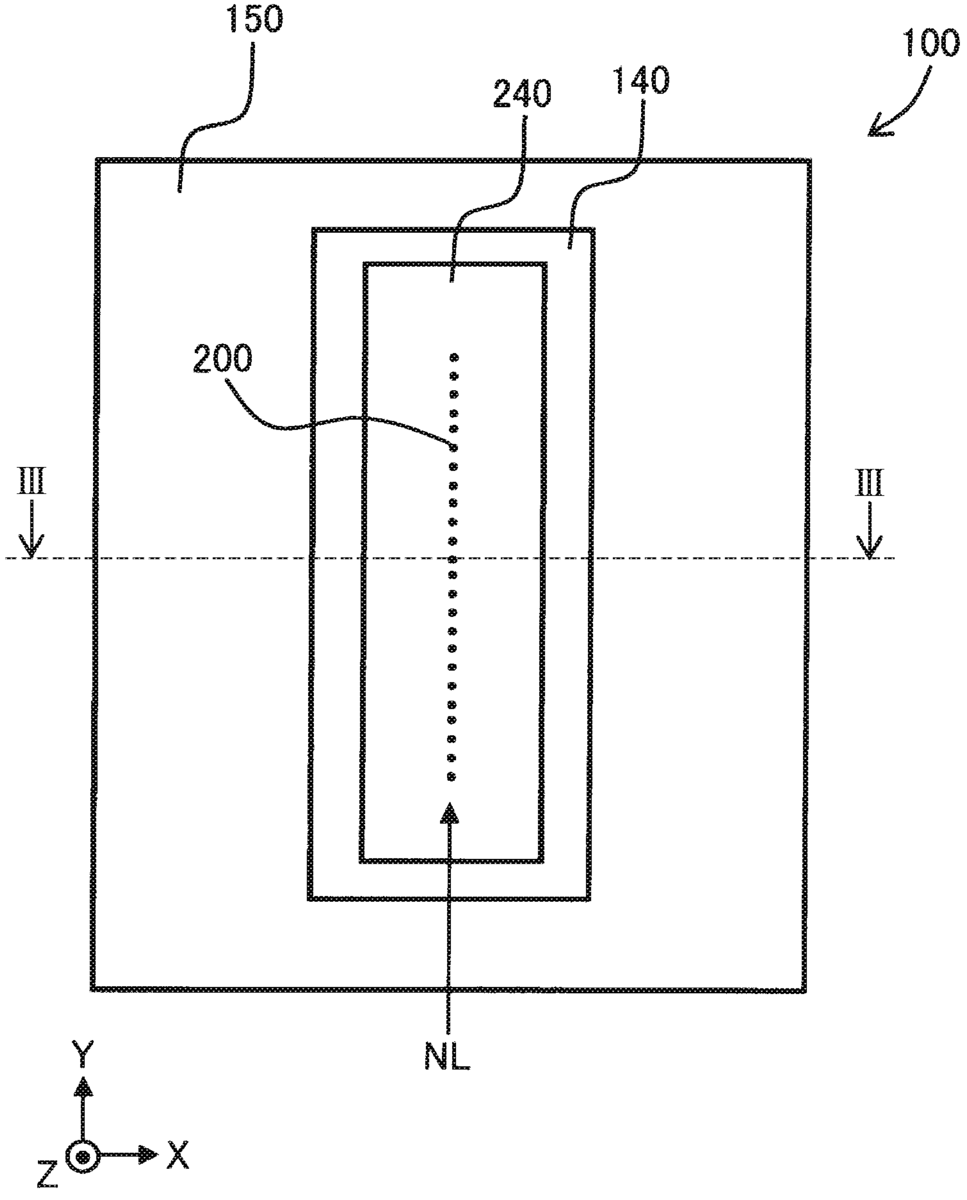
FIG. 2 is a bottom view of a liquid ejecting head.

FIG. 2 is a bottom view of the liquid ejecting head 100. The liquid ejecting head 100 includes the plurality of nozzles 200. The plurality of nozzles 200 are formed to penetrate a nozzle plate 240 disposed parallel to the XY plane. The plurality of nozzles 200 constitute a nozzle array NL by being linearly arranged in the Y direction. The nozzle plate 240 is manufactured, for example, by processing a silicon single crystal substrate using semiconductor processing technology. As the silicon single crystal substrate, for example, a (100) silicon single crystal substrate is preferably used. Note that the nozzle plate 240 may be made of a material such as stainless steel (SUS) or titanium.

Figure 3:
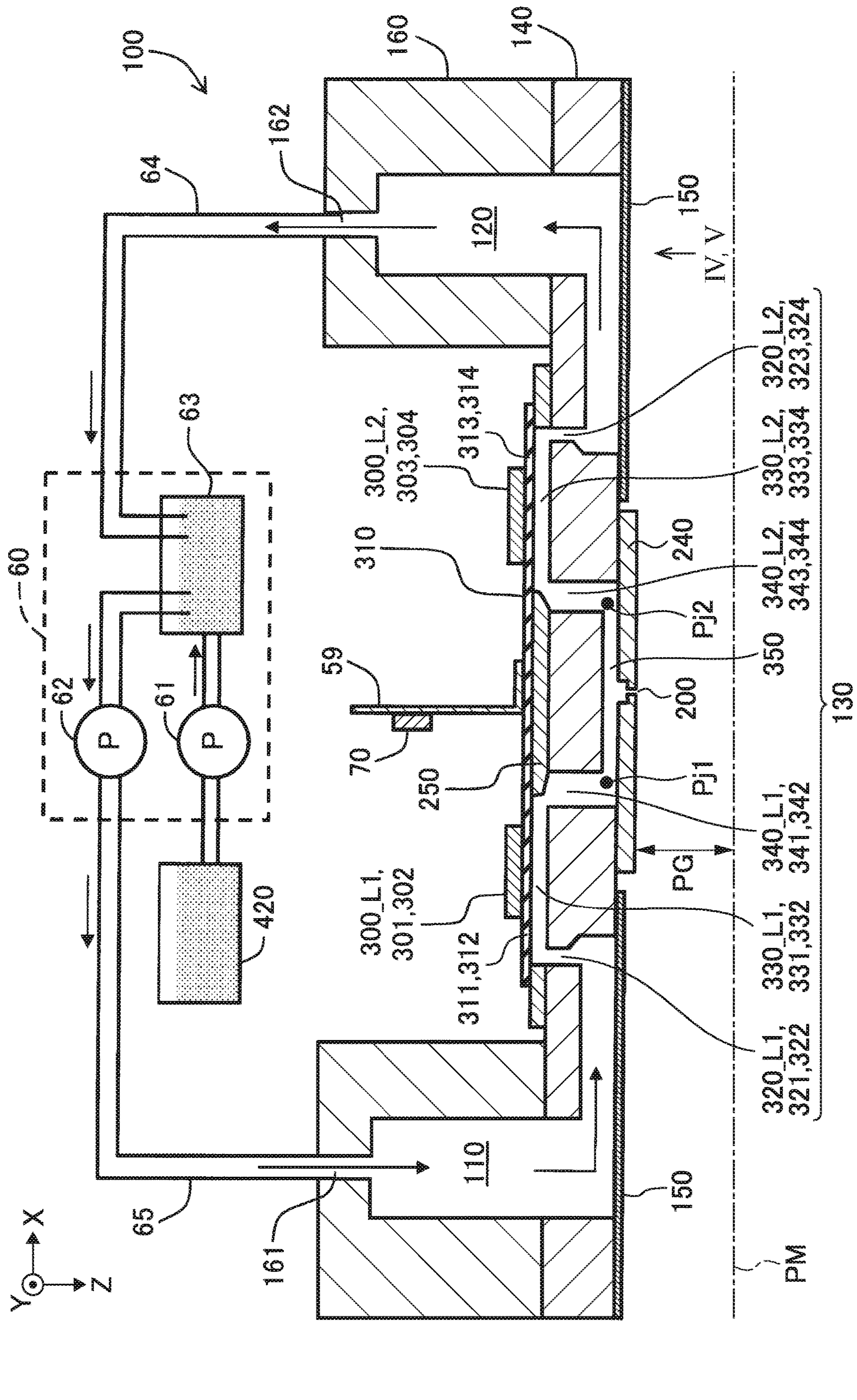
FIG. 3 is a cross-sectional view illustrating a cross section taken along the line III-III of FIG. 2.
Figure 4:
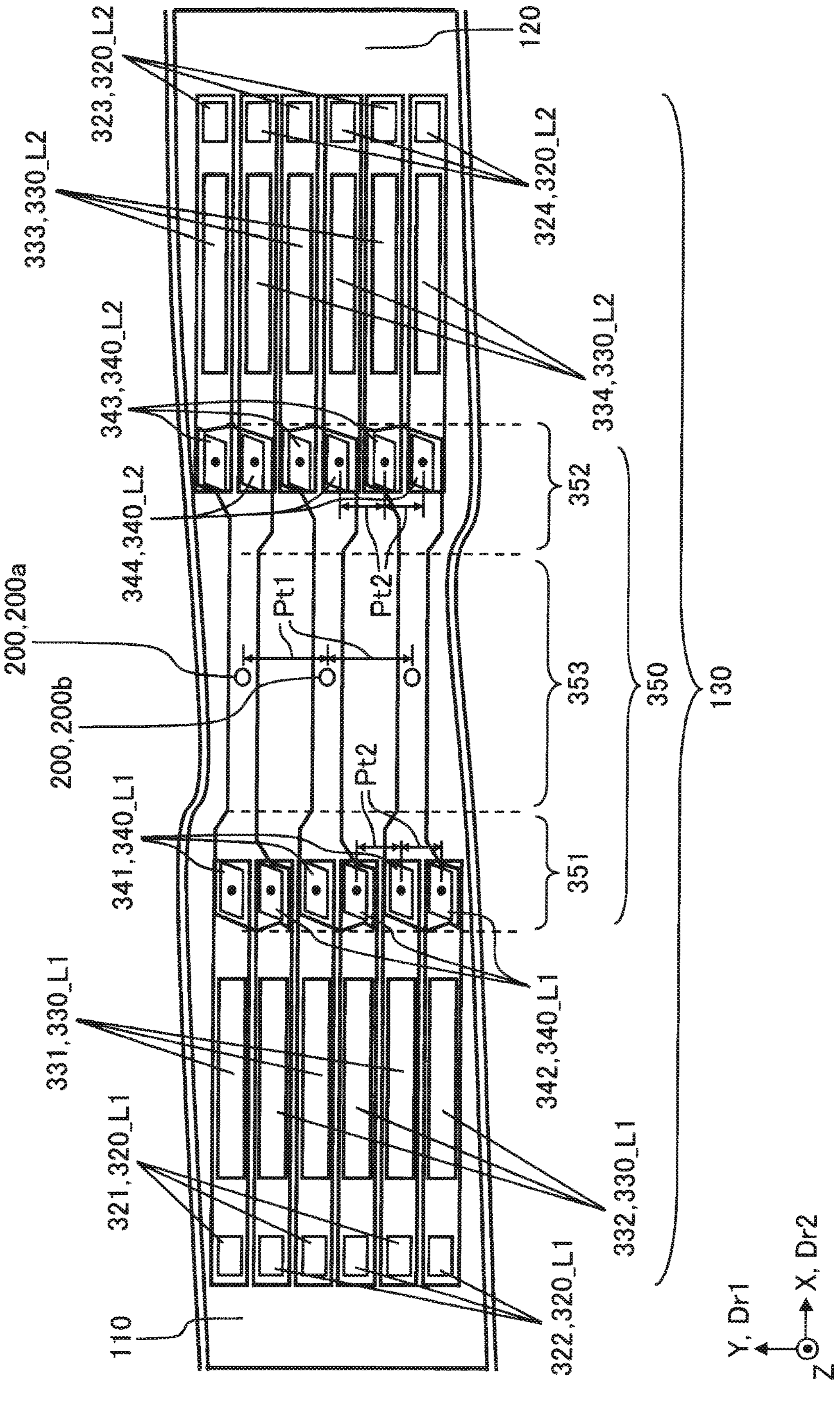
FIG. 4 is a view illustrating a part of flow paths for three nozzles and first and second common liquid chambers, viewed from the bottom of FIG. 3.
Figure 5:
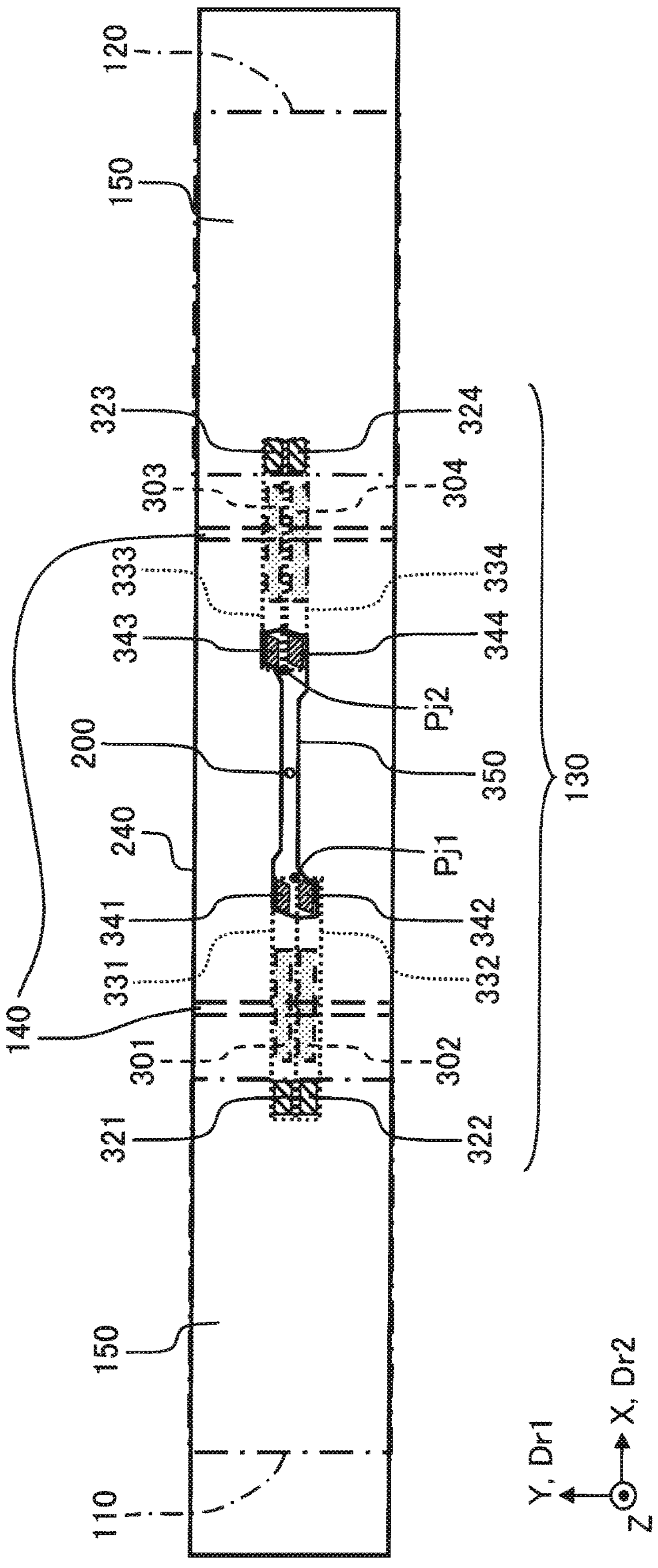
FIG. 5 is a view illustrating a part of a flow path for one nozzle viewed from the bottom of FIG. 3.
Figure 6:
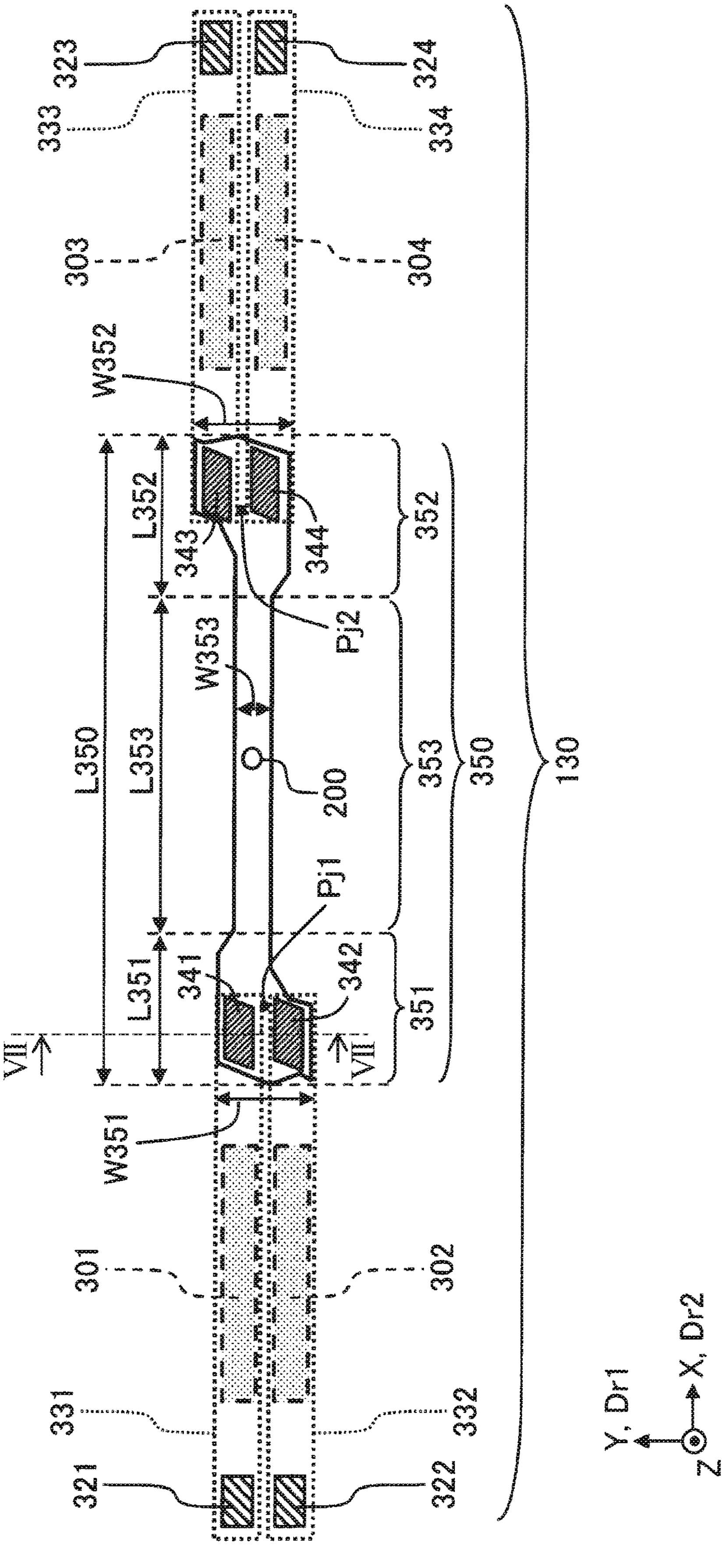
FIG. 6 is an enlarged view of the flow path of FIG. 5.
Figure 7:
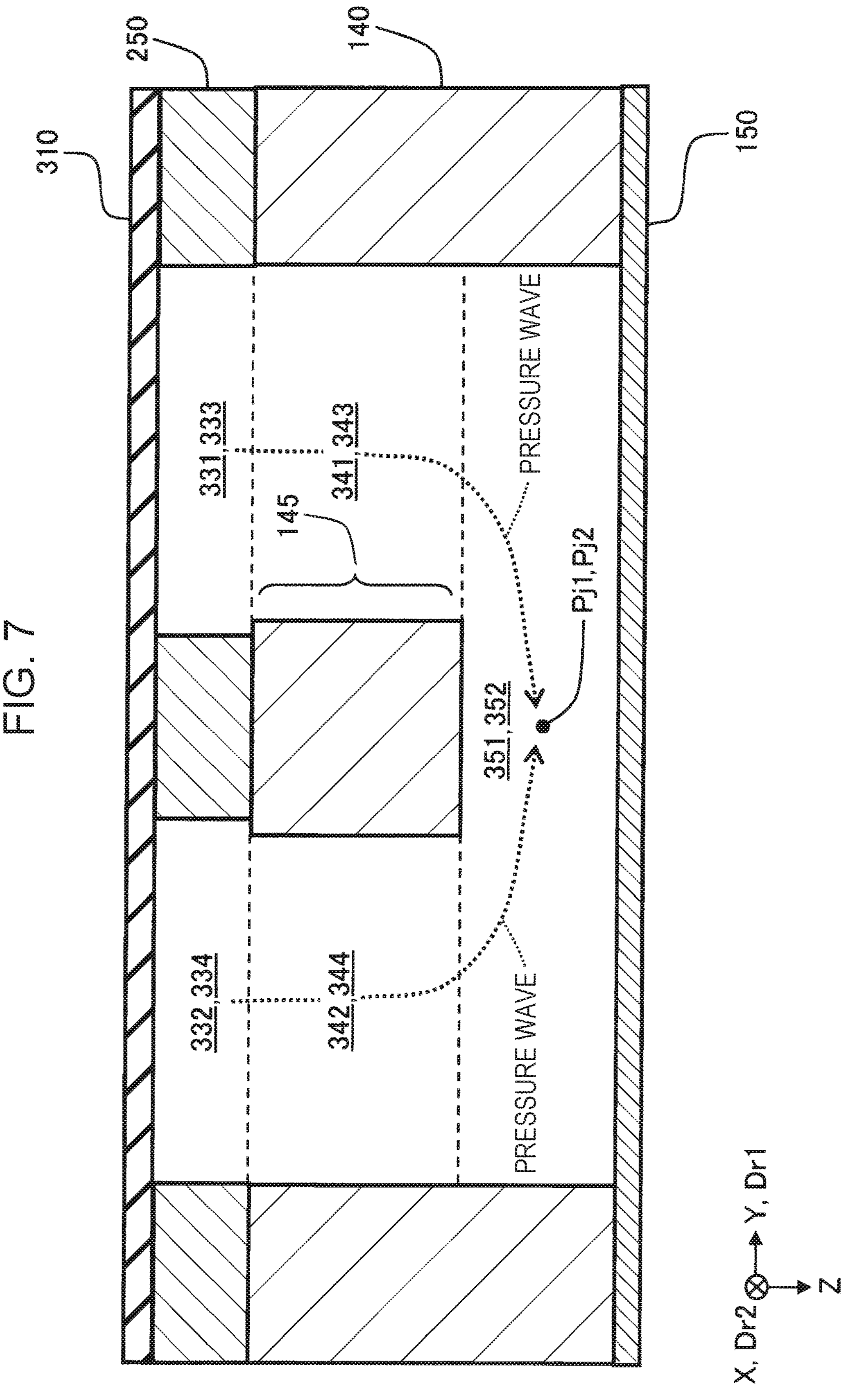
FIG. 7 is a cross-sectional view illustrating a cross section taken along the line VII-VII of FIG. 6.

FIG. 3 is a cross-sectional view illustrating a cross section taken along the line III-III of FIG. 2. FIG. 4 is a view illustrating a part of flow paths for three nozzles, a first common liquid chamber 110, and a second common liquid chamber 120, viewed from the bottom of FIG. 3. FIG. 5 is a view illustrating a part of a flow path for one nozzle and the common liquid chambers 110 and 120, viewed from the bottom of FIG. 3. FIG. 6 is an enlarged view of the flow path of FIG. 5. FIG. 7 is a cross-sectional view illustrating a cross section taken along the line VII-VII of FIG. 6. Note that FIG. 4 illustrates only the three nozzle-specific flow paths 130, the first common liquid chamber 110, and the second common liquid chamber 120. In addition, in FIGS. 5 and 6, for convenience of illustration, the communication flow path 350 is drawn with solid lines, the pressure chamber 330 is drawn with dotted lines, the driving element 300 is drawn with dashed lines, and the common liquid chambers 110 and 120 are drawn with dot dash lines. Further, in FIG. 7, after the reference numerals of each part in the cross section at positions of the pressure chambers 331 and 332, the reference numerals of each part in the cross section taken along the line VII-VII of FIG. 6 at positions of other pressure chambers 333 and 334 are illustrated in parentheses.

As illustrated in FIG. 4, an interval Pt1 between adjacent nozzles 200, that is, the distance between the centers of the nozzles 200 in the Y direction is constant. Further, an interval Pt2 between adjacent pressure chambers 330_L1 among the plurality of pressure chambers 330_L1 constituting a row L1, that is, the distance between the centers of the pressure chambers 330_L1 in the Y direction is constant. A row L2 has a similar relationship. Furthermore, the interval Pt2 in the row L1 and the interval Pt2 in the row L2 are the same, with the interval Pt2 being half the interval Pt1. In addition, the interval Pt2 between the pressure chambers 330 is the same as the interval between the communication holes 340, and is also the same as the interval between the centers of the nozzles 200 in the Y direction.

As illustrated in FIG. 3, the liquid ejecting head 100 includes a first common liquid chamber 110 to which ink is supplied, a second common liquid chamber 120 to which ink is discharged, and a nozzle-specific flow path 130 that couples the first common liquid chamber 110 and the second common liquid chamber 120. The first common liquid chamber 110 and the second common liquid chamber 120 are provided commonly to the plurality of nozzles 200, and the nozzle-specific flow paths 130 are provided individually for the individual nozzles 200. Each of the common liquid chambers 110 and 120 extends in the Y direction, which is the direction along the nozzle array NL. That is, the longitudinal direction of the common liquid chambers 110 and 120 is parallel to the direction in which the plurality of nozzles 200 are arranged.

The liquid ejecting head 100 has a row L1 of the plurality of pressure chambers 330 communicating with the first common liquid chamber 110, and a row L2 of the plurality of pressure chambers 330 communicating with the second common liquid chamber 120. The row L1 is formed by arranging the plurality of pressure chambers 330 in the Y direction, and the row L2 is formed by arranging the plurality of pressure chambers 330 in the Y direction. The row L1 is arranged on the −X side with respect to the nozzle array NL, and the row L2 is arranged on the +X side with respect to the nozzle array NL. Hereinafter, the plurality of pressure chambers 330 forming the row L1 will be referred to as pressure chambers 330_L1, and the plurality of pressure chambers 330 forming the row L2 will be referred to as pressure chambers 330_L2. Regarding the driving elements 300, the coupling flow paths 320, and the communication holes 340, which will be described later in detail, the driving element 300 corresponding to the row L1 is referred to as a driving element 300_L1, the driving element 300 corresponding to the row L2 is referred to as a driving element 300_L2, a coupling flow path 320 corresponding to the row L1 is referred to as a coupling flow path 320_L1, a coupling flow path 320 corresponding to the row L2 is referred to as a coupling flow path 320_L2, a communication hole 340 corresponding to the row L1 is referred to as a communication hole 340_L1, and a communication hole 340 corresponding to the row L2 is referred to as a communication hole 340_L2.

The nozzle-specific flow paths 130 corresponding to one nozzle 200 in this embodiment include two pressure chambers 330_L1 in the row L1, two pressure chambers 330_L2 in the row L2, two coupling flow paths 320_L1 corresponding to each of the two pressure chambers 330_L1, two coupling flow paths 320_L2 corresponding to each of the two pressure chambers 330_L2, two communication holes 340_L1 corresponding to each of the two pressure chambers 330_L1, two communication holes 340_L2 corresponding to each of the two pressure chambers 330_L2, and the communication flow path 350. Here, the two pressure chambers 330_L1 in the row L1 are referred to as pressure chambers 331 and 332, the two pressure chambers 330_L2 in the row L2 are referred to as pressure chambers 333 and 334, these two coupling flow paths 320_L1 are referred to as coupling flow paths 321 and 322, these two coupling flow paths 320_L2 are referred to as coupling flow paths 323 and 324, these two communication holes 340_L1 are referred to as communication holes 341 and 342, and these two communication holes 340_L2 are referred to as communication holes 343 and 344. In addition, the four driving elements 300 corresponding to each of the pressure chambers 331 to 334 are referred to as driving elements 301 to 304.

Each of the common liquid chambers 110 and 120 can be considered to extend in the Y direction or in the direction in which the adjacent pressure chambers 331 and 332 are arranged, that is, the direction in which the row L1 of the pressure chambers 330 extends in the extending direction. In this embodiment, the direction in which the adjacent pressure chambers 331 and 332 are arranged is an example of the "first direction". In addition, the plurality of nozzle-specific flow paths 130 are arranged in the Y direction along the nozzle array NL.

The lower portions of the common liquid chambers 110 and 120 and the plurality of nozzle-specific flow paths 130 are mainly formed by a communication plate 140. The communication plate 140 may be configured by laminating a plurality of plate-shaped members. A housing section 160 and a pressure chamber substrate 250 are installed on the upper surface of the communication plate 140, that is, the surface of the communication plate 140 facing the −Z side. The pressure chamber substrate 250 is positioned inside the housing section 160 in plan view in the Z direction. A vibrating plate 310 is positioned on the upper surface of the pressure chamber substrate 250, that is, the surface of the pressure chamber substrate 250 facing the −Z side. The plurality of pressure chambers 330 are provided in the pressure chamber substrate 250. Each pressure chamber 330 is a space defined by the communication plate 140, the vibrating plate 310, and the pressure chamber substrate 250. The pressure chamber substrate 250 is manufactured, for example, by processing a silicon single crystal substrate using semiconductor processing technology. As the silicon single crystal substrate, for example, a (110) substrate, that is, a silicon single crystal substrate having a (110) surface as a main surface is preferably used.

The vibrating plate 310 is a plate-shaped member that can elastically vibrate. The vibrating plate 310 is, for example, a laminated body including a first layer made of silicon oxide ($SiO_2$) and a second layer made of zirconium oxide ($ZrO_2$). Further, another layer such as a metal oxide may be interposed between the first layer and the second layer. Further, some or all of the vibrating plates 310 may be integrally made of the same material as the pressure chamber substrate 250. For example, the vibrating plate 310 and the pressure chamber substrate 250 can be integrally formed by selectively removing a part of the thickness direction of the region corresponding to the pressure chamber 330 in a plate-shaped member having a predetermined thickness by etching or the like. Further, the vibrating plate 310 may be composed of a layer of a single material.

A nozzle plate 240 is installed on the lower surface of the communication plate 140, that is, the surface facing the +Z side of the communication plate 140, and the lower end portions of the first common liquid chamber 110 and the second common liquid chamber 120, that is, the end portions on the +Z side of the first common liquid chamber 110 and the second common liquid chamber 120 are sealed with a flexible sealing film 150 made of a resin film, a thin metal film, or the like.

A wiring substrate 59 is bonded to the surface of the vibrating plate 310 facing the −Z side. The wiring substrate 59 is a mounting component formed with a plurality of wirings for electrically coupling the control section 450 and the liquid ejecting head 100. The wiring substrate 59 is, for example, a flexible wiring substrate such as a flexible printed circuit (FPC) or a flexible flat cable (FFC). A drive circuit 70 for driving the driving element 300 is mounted on the wiring substrate 59. The drive circuit 70 supplies a driving signal to each driving element 300.

A plurality of driving elements 300 are provided corresponding to each of the pressure chambers 330 on the upper surface of the vibrating plate 310, that is, the surface of the vibrating plate 310 facing the −Z side. These driving elements 300 are composed of piezoelectric elements, for example. The piezoelectric element is composed of, for example, a piezoelectric layer and two electrodes provided to sandwich the piezoelectric layer. For example, when the driving elements 301 to 304, which are piezoelectric elements, vibrate, the vibrations are transmitted to the pressure chambers 331 to 334, respectively, and pressure waves are generated in the pressure chambers 331 to 334, respectively. Ink is ejected from nozzles 200 by the pressure generated by the driving elements 301 to 304. When ink is ejected from the nozzle 200, it is preferable that the four driving elements 301 to 304 corresponding to the nozzle 200 be driven simultaneously in the same phase. A part of the vibrating plate 310 provided with the first driving element 301 on a surface opposite to the surface defining the first pressure chamber 331 is referred to as a first vibration section 311. Similarly, each part of the vibrating plate 310 provided with the second to fourth driving elements 302 to 304 is referred to as second to fourth vibration sections 312 to 314. As the driving element, a heat generating element that heats the ink in the pressure chamber 330 may be used instead of the piezoelectric element.

The circulation mechanism 60 is coupled to the common liquid chambers 110 and 120. The circulation mechanism 60 supplies ink to the first common liquid chamber 110 and collects ink discharged from the second common liquid chamber 120 for resupply to the first common liquid chamber 110. The circulation mechanism 60 includes a first supply pump 61, a second supply pump 62, a storage container 63, a collection flow path 64, and a supply flow path 65.

The first supply pump 61 is a pump that supplies the ink stored in the liquid storage section 420 to the storage container 63. The storage container 63 is a sub tank that temporarily stores the ink supplied from the liquid storage section 420. The collection flow path 64 is interposed between the second common liquid chamber 120 and the storage container 63 and is a flow path for collecting the ink from the second common liquid chamber 120 to the storage container 63. The ink stored in the liquid storage section 420 is supplied from the first supply pump 61 to the storage container 63. Further, the ink, which is supplied from the first common liquid chamber 110 to each nozzle-specific flow path 130, but is discharged from each nozzle-specific flow path 130 to the second common liquid chamber 120 without being ejected from the nozzle 200, is supplied to the storage container 63 through the collection flow path 64. The second supply pump 62 is a pump that sends the ink stored in the storage container 63. The supply flow path 65 is interposed between the first common liquid chamber 110 and the storage container 63 and is a flow path for supplying the ink in the storage container 63 to the first common liquid chamber 110.

An opening portion 161 at the upper end of the first common liquid chamber 110, that is, the end portion on the −Z side of the first common liquid chamber 110 is coupled to the supply flow path 65 outside the liquid ejecting head 100. In other words, the opening portion 161 of this embodiment functions as an inlet for introducing the liquid from the circulation mechanism 60. An opening portion 162 at the upper end of the second common liquid chamber 120, that is, the end portion on the −Z side of the second common liquid chamber 120 is coupled to the collection flow path 64 of the circulation mechanism 60 outside the liquid ejecting head 100. In other words, the opening portion 162 of this embodiment functions as an outlet for discharging the liquid to the circulation mechanism 60.

The nozzle-specific flow path 130 has the following flow paths and spaces. In the following description, the term "coupling" is used in the sense of direct coupling. In addition, the term "communication" is used in a broad sense including not only direct coupling but also indirect coupling.

Coupling Flow Paths 321 to 324

The first coupling flow path 321 couples the first common liquid chamber 110 and the first pressure chamber 331.

The second coupling flow path 322 couples the first common liquid chamber 110 and the second pressure chamber 332.

The third coupling flow path 323 couples the second common liquid chamber 120 and the third pressure chamber 333.

The fourth coupling flow path 324 couples the second common liquid chamber 120 and the fourth pressure chamber 334.

All of the coupling flow paths 321 to 324 are flow paths extending in the Z direction and penetrate the communication plate 140. In FIGS. 5 and 6, the coupling flow paths 321 to 324 are hatched for convenience of illustration. A part where the coupling flow path 320 and the pressure chamber 330 intersect can be regarded as a part of the pressure chamber 330.

Pressure Chambers 331 to 334

The first pressure chamber 331 to the fourth pressure chamber 334 are spaces that receive pressure changes by the first driving element 301 to the fourth driving element 304, respectively. The first pressure chamber 331 and the second pressure chamber 332 are arranged side by side in a first direction Dr1, and the third pressure chamber 333 and the fourth pressure chamber 334 are also arranged side by side in the first direction Dr1. In this embodiment, the first direction Dr1 is parallel to the Y direction. The first pressure chamber 331 and the second pressure chamber 332, and the third pressure chamber 333 and the fourth pressure chamber 334 are arranged to be shifted in a second direction Dr2 orthogonal to the first direction Dr1. In this embodiment, the second direction Dr2 is parallel to the X direction. The pressure waves generated in the first pressure chamber 331 to the fourth pressure chamber 334 reach the nozzle 200 and eject ink from the nozzle 200. The pressure chambers 331 to 334 preferably have the same shape. In this embodiment, a plurality of pressure chambers 331 to 334 are arranged in a staggered pattern. Each of the pressure chambers 330 extends in the second direction Dr2.

Communication Holes 341 to 344

The first communication hole 341 to the fourth communication hole 344 are flow paths respectively extending in the Z direction and coupling the communication flow path 350 and each of the first pressure chamber 331 to the fourth pressure chamber 334. That is, each of the pressure chambers 330 has one end coupled to the coupling flow path 320 and the other end coupled to the communication hole 340. The first communication hole 341 to the fourth communication hole 344 are examples of the "first flow path" to the "fourth flow path", respectively. In addition, in FIGS. 5 and 6, the communication holes 341 to 344 are hatched for convenience of illustration. The first communication hole 341 and the second communication hole 342 are arranged side by side in the first direction Dr1, and the third communication hole 343 and the fourth communication hole 344 are also arranged side by side in the first direction Dr1. In FIG. 7, the first communication hole 341 and the second communication hole 342 are partitioned by a communication hole partition wall 145. The communication holes 341 to 344 are flow paths extending in the same direction as the coupling flow paths 321 to 324 and penetrate the communication plate 140. The communication holes 341 to 344 preferably have the same shape. A part where the communication hole 340 and the pressure chamber 330 intersect can be regarded as a part of the pressure chamber 330.

Communication Flow Path 350

As illustrated in FIG. 3, the communication flow path 350 is a flow path that is coupled to the nozzle 200 and communicates between the nozzle 200 and the first pressure chamber 331 to the fourth pressure chamber 334. In addition, the communication flow path 350 is a flow path extending along the nozzle surface of the nozzle plate 240 on which the plurality of nozzles 200 are formed, and the nozzles 200 are provided in the middle of the communication flow path 350. Specifically, the communication flow path 350 extends in the X direction and is defined by the communication plate 140 and the surface of the nozzle plate 240 facing the −Z side. As illustrated in FIG. 6, the communication flow path 350 includes a first part 351, a second part 352, and a third part 353. The first part 351 of the communication flow path 350 is disposed at one end of the communication flow path 350 and coupled to the first communication hole 341 and the second communication hole 342. The second part 352 of the communication flow path 350 is disposed at the other end of the communication flow path 350 and coupled to the third communication hole 343 and the fourth communication hole 344. The third part

353 of the communication flow path 350 is coupled between the first part 351 and the second part 352. Note that the third part 353 is a part narrower than the width of the first part 351 or the second part 352 in the first direction Dr1. Further, in this embodiment, a width W353 of the third part 353 in the first direction Dr1 is constant. A part where the first to fourth communication holes 341 to 344 and the communication flow path 350 intersect can be regarded as a part of the communication flow path 350.

The pressure waves generated in the first pressure chamber 331 and the second pressure chamber 332 are joined at the lower end portions of the first communication hole 341 and the second communication hole 342, that is, a first joining position Pj1 near the end portions on the +Z side of the first communication hole 341 and the second communication hole 342. The pressure waves generated in the third pressure chamber 333 and the fourth pressure chamber 334 are joined at the lower end portions of the third communication hole 343 and the fourth communication hole 344, that is, a second joining position Pj2 near the end portions on the +Z side of the third communication hole 343 and the fourth communication hole 344. These pressure waves act as a driving force for ejecting ink from the nozzles 200.

As the ink, for example, a liquid having pseudoplasticity can be used. More specifically, it is preferable that the ink have a viscosity of 0.01 Pa·s or more and 0.2 Pa·s or less at a shear rate of 1000 $s^{-1}$ at 25° C., and a viscosity of 0.5 Pa·s or more and 50 Pa·s or less at a shear rate of 0.01 $s^{-1}$. In this embodiment, the four pressure chambers 331 to 334 are used to reduce the cross-sectional area of each flow path, increase the flow speed, and reduce the viscosity of the ink, thereby making it possible to use liquid ink having pseudoplasticity. However, from the pressure chambers 331 to 334 to the nozzle 200, it is desirable to efficiently use the energy of the driving elements 301 to 304, and thus it is not preferable to excessively increase the flow path resistance. Therefore, in this embodiment, as illustrated in FIG. 5, the individual flow paths from the adjacent pressure chambers 330 to the nozzle 200 are joined earlier at the joining positions Pj1 and Pj2 closer to the pressure chamber than to the nozzle 200. Accordingly, the flow path resistance is prevented from becoming excessively large.

In this embodiment, four pressure chambers 331 to 334 are provided for one nozzle 200, but five or more pressure chambers may be provided. In either case, driving elements are provided to correspond to individual pressure chambers.

The nozzle-specific flow path 130 of this embodiment can be considered to include four individual flow paths corresponding to the four driving elements 301 to 304. An "individual flow path" is a flow path including at least the pressure chamber 330, and one individual flow path corresponds to one driving element 300. In this embodiment, the first individual flow path can be considered to include the first coupling flow path 321, the first pressure chamber 331, and the first communication hole 341. The second to fourth individual flow paths can also be grasped in the same manner.

A distance PG between the medium PM and the nozzle 200 can be set by the user using the input receiving section 460. The liquid ejecting apparatus 400 has a gap adjusting mechanism (not illustrated), and the distance PG between the medium PM and the nozzle 200 is adjusted according to a setting by the user. Normally, the distance PG is set to a small value when high-quality printing is performed, and the distance PG is set to a large value when low-quality printing is performed at higher speed.

The liquid ejecting head 100 of the first embodiment has the following features related to attenuation of pressure waves.

Feature F1

As illustrated in FIG. 6, the first joining position Pj1 is closer to the end portion of the pressure chambers 331 and 332 on the nozzle 200 side than to the nozzle 200 in plan view in the Z direction. That is, the distance from the first joining position Pj1 to each end portion of the pressure chambers 331 and 332 on the nozzle 200 side is shorter than the distance from the first joining position Pj1 to the nozzle 200. Here, the "first end portion of the pressure chamber 331 on the nozzle 200 side" means the end portion opposite to the first common liquid chamber 110, that is, the end portion on the +X side, of both end portions of the pressure chamber 331 in the X direction. The "second end portion of the pressure chamber 332 on the nozzle 200 side" means the end portion opposite to the first common liquid chamber 110, that is, the end portion on the +X side, of both end portions of the pressure chamber 332 in the X direction. Similarly, the second joining position Pj2 is closer to the end portions of the pressure chambers 333 and 334 than to the nozzle 200 in plan view in the Z direction. The "third end portion of the pressure chamber 333 on the nozzle 200 side" means the end portion opposite to the second common liquid chamber 120, that is, the end portion on the −X side, of both end portions of the pressure chamber 333 in the X direction. The "fourth end portion of the pressure chamber 334 on the nozzle 200 side" means the end portion opposite to the second common liquid chamber 120, that is, the end portion on the −X side, of both end portions of the pressure chamber 334 in the X direction.

According to this feature F1, the pressure wave from the first pressure chamber 331 and the pressure wave from the second pressure chamber 332 are combined not in the vicinity of the nozzle 200 but in the vicinity of the pressure chambers 331 and 332. Therefore, compared to the example of the related art in which the pressure wave from the first pressure chamber 331 and the pressure wave from the second pressure chamber 332 are combined in the vicinity of the nozzle 200, excessive attenuation of pressure waves directed from the individual pressure chambers 330 to the nozzles 200 can be prevented. The same applies to the third pressure chamber 333 and the fourth pressure chamber 334 as well.

Moreover, according to the feature F1, compared to the example of the related art, the ratio of the part common to the pressure chambers 331 and 332 in the flow path from each end portion of the pressure chambers 331 and 332 to the nozzle 200 can be increased. Therefore, compared to the example of the related art, the flow path resistance from the pressure chambers 331 and 332 to the nozzle 200 can be reduced. The same applies to the third pressure chamber 333 and the fourth pressure chamber 334 as well. As a result, the pressure loss can be reduced and ejection efficiency can be improved. In particular, when using high-viscosity ink such as pseudoplastic ink, the effect of improving ejection efficiency is remarkable. On the other hand, as in the example of the related art, in the configuration in which the pressure waves join in the vicinity of the nozzle 200, the pressure waves are greatly attenuated and the ejection efficiency is lowered. In addition, there is a concern that it will be difficult to refill the nozzles 200 with ink, or that air bubbles will be caught in the nozzles.

In addition, the first joining position Pj1 can also be considered as the joining position of the flow path from the first pressure chamber 331 to the nozzle 200 and the flow path from the second pressure chamber 332 to the nozzle 200. Similarly, the second joining position Pj2 can also be considered as the joining position of the flow path from the third pressure chamber 333 to the nozzle 200 and the flow path from the fourth pressure chamber 334 to the nozzle 200. As described above, in practice, the liquid is supplied from the outside to the first common liquid chamber 110, and guided from the first common liquid chamber 110 to the first pressure chamber 331 and the second pressure chamber 332. After this, a part of the liquid is ejected from the nozzle 200 in the communication flow path 350, guided to the second common liquid chamber 120 via the third pressure chamber 333 and the fourth pressure chamber 334, and discharged from the second common liquid chamber 120 to the outside. Therefore, both the "flow path from the third pressure chamber 333 to the nozzle 200" and the "flow path from the fourth pressure chamber 334 to the nozzle 200" are assumed to flow in the opposite orientation to the actual liquid flow. However, it can be understood that these flow paths can be assumed regardless of the orientation of the liquid.

Feature F2

As illustrated in FIG. 6, in plan view in the Z direction, the first joining position Pj1 is between the first pressure chamber 331 and the second pressure chamber 332, and the second joining position Pj2 is between the third pressure chamber 333 and the fourth pressure chamber 334.

Feature F3

As illustrated in FIG. 6, the communication flow path 350 has the first joining position Pj1 at one end portion and the second joining position Pj2 at the other end portion. According to this feature F3, the pressure waves from the pressure chambers 331 and 332 join near their sources, the pressure waves from the pressure chambers 333 and 334 join near their sources, and thus attenuation of pressure waves can be suppressed more efficiently.

Feature F4

As illustrated in FIGS. 6 and 7, the first joining position Pj1 is positioned at the first part 351 of the communication flow path 350, and the second joining position Pj2 is positioned at the second part 352 of the communication flow path 350. According to this feature F4, as illustrated in FIG. 7, the communication hole partition walls 145 exist between the communication holes 341 and 342 adjacent to each other and between the communication holes 343 and 344, respectively, and thus crosstalk between the pressure chambers 331 and 332 and crosstalk between the pressure chambers 333 and 334 can be reduced.

Feature F5

As illustrated in FIG. 6, a dimension L353 of the third part 353 of the communication flow path 350 measured in the second direction Dr2 is longer than a dimension L351 of the first part 351. In addition, a dimension L353 of the third part 353 is longer than a dimension L352 of the second part 352.

Feature F6

As illustrated in FIG. 6, the third part 353 of the communication flow path 350 is coupled to the nozzle 200. According to this feature F6, the pressure waves from the pressure chambers 331 to 334 join near their sources, and thus attenuation of pressure waves can be suppressed more efficiently.

Feature F7

As illustrated in FIG. 6, a width W353 of the third part 353 of the communication flow path 350 measured in the first direction Dr1 is less than a width W351 of the first part 351. In addition, the width W353 of the third part 353 is less than the width W352 of the second part 352. According to this feature F7, when using a liquid having pseudoplasticity, the width W353 of the third part 353 is reduced, and accordingly, it is possible to increase the flow speed in the vicinity of the nozzle 200 and reduce the viscosity of the ink in the vicinity of the nozzle 200.

Feature F8

As illustrated in FIG. 3, each of the first communication hole 341 to the fourth communication hole 344 extends in a direction intersecting the extending direction of the communication flow path 350. That is, the longitudinal direction of each of the first communication hole 341 to the fourth communication hole 344 is the direction intersecting the longitudinal direction of the communication flow path 350. In this embodiment, the X direction is an example of the "extending direction of the communication flow path 350", and the Z direction is an example of the "direction intersecting the extending direction of the communication flow path 350".

It is also possible to consider that the first communication hole 341 to the fourth communication hole 344 extend in a direction intersecting the direction in which the pressure chambers 330 adjacent to each other are arranged. In addition, as can be seen from FIG. 3, it is also possible to consider that the first communication hole 341 to the fourth communication hole 344 extend in the direction perpendicular to the front surface of the nozzle plate 240. Furthermore, it is also possible to consider that the first communication hole 341 to the fourth communication hole 344 extend in the ejection direction Z.

Feature F9

As illustrated in FIG. 3, each of the communication holes 341 to 344 is closer to the nozzle 200 than is the coupling flow paths 321 to 324 in plan view in the Z direction. In other words, each distance from each of the communication holes 341 to 344 to the coupling flow paths 321 to 324 is shorter than each distance from each of the communication holes 341 to 344 to the nozzle 200. According to this feature F9, the communication flow path 350 can be shortened, and the flow path resistance can be reduced.

The liquid ejecting head 100 of the first embodiment has at least some of the features F1 to F9 described above, and thus the pressure waves can be combined on the pressure chambers 331 to 334 side instead of on the nozzle 200 side, and excessive attenuation of pressure waves directed from the individual pressure chambers 330 to the nozzles 200 can be prevented. In addition, some or all of the above-described features may be omitted. Further, the liquid ejecting head 100 having a configuration other than the above-described configuration may be used.

Figure 8:
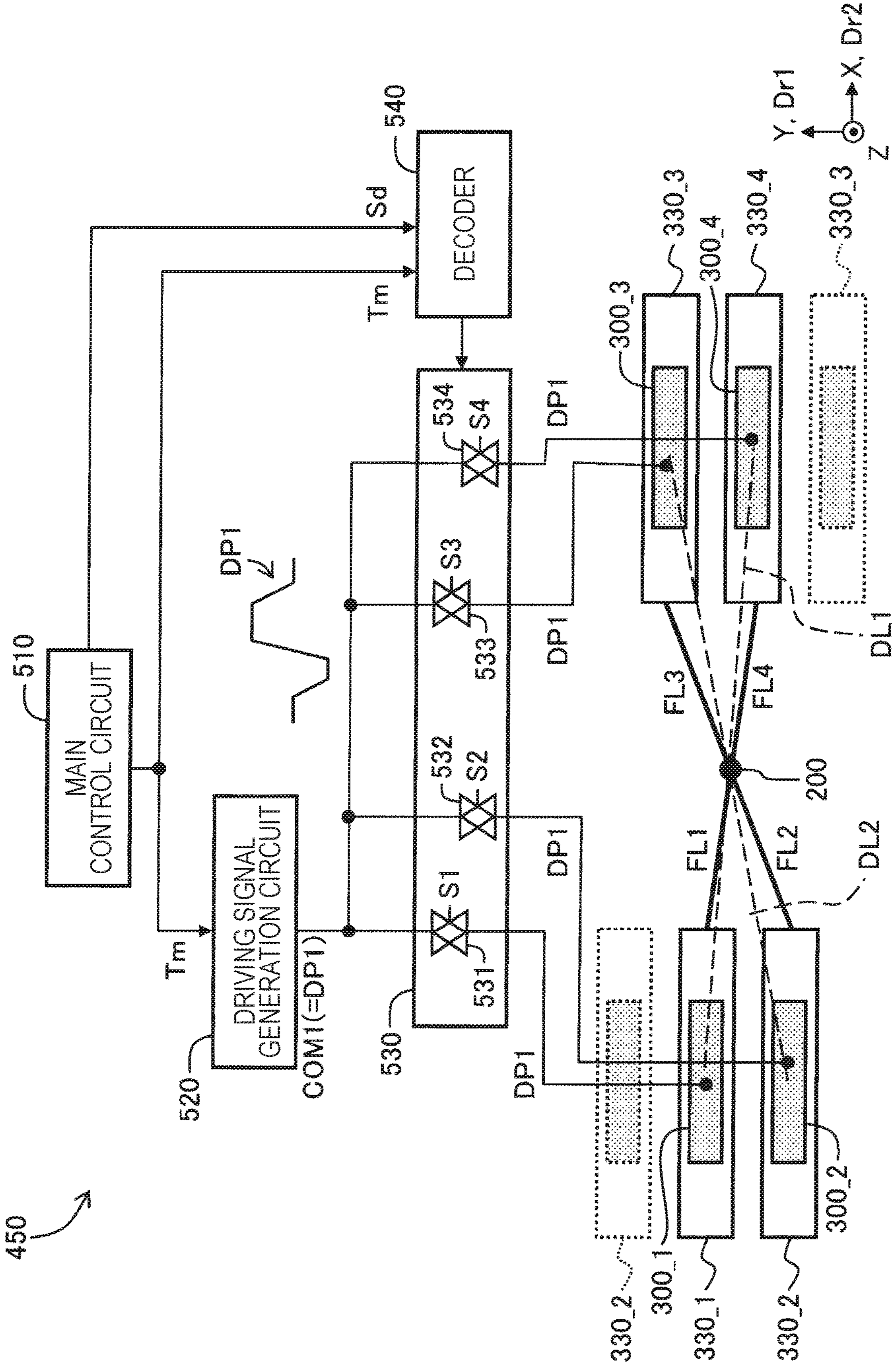
FIG. 8 is an explanatory diagram illustrating a head drive function of a control section according to a first embodiment.

B. Configuration and Driving Method of Control Section According to First Embodiment FIG. 8 is an explanatory diagram illustrating a head drive function of the control section 450 according to the first embodiment. A circuit part related to driving the liquid ejecting head 100 is drawn at the upper portion of FIG. 8, and a plurality of pressure chambers 330_1 to 330_4, the nozzle 200, and flow path lengths FL1 to FL4 from the pressure chambers 330_1 to 330_4 to the nozzle 200 are drawn at the lower portion of FIG. 8.

The plurality of pressure chambers 330_1 to 330_4 correspond to the pressure chambers 331 to 334 illustrated in FIGS. 3 to 6. Further, the driving elements 300_1 to 300_4 drawn in the pressure chambers 330_1 to 330_4 correspond to the driving elements 301 to 304 illustrated in FIGS. 3 to 6. In plan view in the Z direction, the first pressure chamber 330_1 and the second pressure chamber 330_2 are arranged on the −X side, which is one side with respect to the nozzle 200, and the third pressure chamber 330_3 and the fourth pressure chamber 330_4 are arranged on the +X side, which is the other side with respect to the nozzle 200. The second pressure chamber 330_2 and the third pressure chamber 330_3 indicated by the dotted line are pressure chambers for other nozzles adjacent to each other.

The plurality of pressure chambers 330_1 to 330_4 are arranged in a staggered pattern. That is, the pressure chambers 330_1 and 330_2 arranged on one side with respect to the nozzle 200 and the pressure chambers 330_3 and 330_4 arranged on the other side are arranged to be shifted in the second direction Dr2 intersecting the first direction Dr1. Further, with respect to the position in the first direction Dr1, the first pressure chamber 330_1 is disposed between the third pressure chamber 330_3 and the fourth pressure chamber 330_4, and the fourth pressure chamber 330_4 is disposed between the first pressure chamber 330_1 and the second pressure chamber 330_2. In other words, the center of the first pressure chamber 330_1 in the first direction Dr1 is disposed between the center of the third pressure chamber 330_3 and the center of the fourth pressure chamber 330_4, and the center of the fourth pressure chamber 330_4 is disposed between the center of the first pressure chamber 330_1 and the center of the second pressure chamber 330_2.

Furthermore, in FIG. 8, a straight line DL1 coupling the first pressure chamber 330_1 and the fourth pressure chamber 330_4 and a straight line DL2 coupling the second pressure chamber 330_2 and the third pressure chamber 330_3 are drawn. In plan view in the Z direction, the nozzle 200 is at a position overlapping the intersection of the straight lines DL1 and DL2. These straight lines DL1 and DL2 are diagonal lines of a quadrangle having the centers of each of the four pressure chambers 330_1 to 330_4 as the vertices. The driving elements 300_1 to 300_4 of the four pressure chambers 330_1 to 330_4 are also present on the straight lines DL1 and DL2.

The mutual positional relationship of the pressure chambers 330_1 to 330_4 in FIG. 8 indicates the positional relationship in plan view in the Z direction, but the flow path lengths FL1 to FL4 indicate not accurate lengths but only the length relationship described below. As illustrated in FIGS. 3 to 6, the flow paths from each of the pressure chambers 330 to the nozzle 200 have a three-dimensionally bent configuration, and the flow path lengths FL1 to FL4 illustrated in FIG. 8 are the lengths measured to follow those three-dimensional flow paths. However, the flow path from each of the pressure chambers 330 to the nozzle 200 does not need to be bent three-dimensionally, and may be configured two-dimensionally.

The flow path lengths FL1 to FL4 have the following relationship.

$$FL1<FL2 \quad (1a)$$

$$FL4<FL3 \quad (1b)$$

$$FL1=FL4 \quad (1c)$$

$$FL2=FL3 \quad (1d)$$

That is, the first flow path length FL1 of the flow path from the first pressure chamber 330_1 to the nozzle 200 is shorter than the second flow path length FL2 of the flow path from the second pressure chamber 330_2 to the nozzle 200. Further, the fourth flow path length FL4 of the flow path from the fourth pressure chamber 330_4 to the nozzle 200 is shorter than the third flow path length FL3 of the flow path from the third pressure chamber 330_3 to the nozzle 200.

These flow path lengths FL1 to FL4 are the lengths of the flow paths from the end portions of the pressure chambers 330_1 to 330_4 to the nozzle 200, but instead, the length of the flow path from the centers of the driving elements 300_1 to 300_4 to the nozzle 200 may be used as the flow path lengths FL1 to FL4. Also in this case, it is preferable that the above formulas (1a) to (1d) are satisfied. However, the above formula (1c) and formula (1d) may not be satisfied.

The control section 450 includes a main control circuit 510, a driving signal generation circuit 520, a switch circuit 530, and a decoder 540. The main control circuit 510 has a function of controlling other circuits in the control section 450. The driving signal generation circuit 520, the switch circuit 530, and the decoder 540 operate in synchronization with a timing signal Tm periodically given by the main control circuit 510 and a clock signal (not illustrated). The main control circuit 510 further supplies the dot size signal Sd to the decoder 540. The dot size signal Sd is a signal representing the size of dots formed on the medium PM by ejecting the liquid, and is generated for each dot position. In addition, the main control circuit 510 and the driving signal generation circuit 520 are shared for controlling the plurality of nozzles 200. Further, the switch circuit 530 and the decoder 540 are provided corresponding to the individual nozzles 200. However, the driving signal generation circuit 520 may be provided individually corresponding to the individual nozzles 200. It is preferable that some circuits of the control section 450 be mounted on the carriage 434 on which the liquid ejecting head 100 is mounted. Further, some circuits of the control section 450 may be a part of the liquid ejecting head 100, and it is particularly preferable that the switch circuit 530 be included in the drive circuit 70.

The driving signal generation circuit 520 generates a common driving signal COM1 including a driving pulse DP1 given to the driving element 300 and supplies the common driving signal COM1 to the switch circuit 530. The driving pulse DP1 is, for example, a trapezoidal wave as illustrated in FIG. 8. The switch circuit 530 has analog switches 531 to 534 corresponding to a plurality of driving elements 300_1 to 300_4. In this embodiment, the same driving pulse DP1 is supplied to the input terminals of the individual analog switches 531 to 534.

The decoder 540 decodes the dot size signal Sd given from the main control circuit 510 to generate the control signals S1 to S4 that realize the dot size represented by the dot size signal Sd. These control signals S1 to S4 are binary signals and are given to the control terminals of the analog switches 531 to 534, respectively. The analog switches 531 to 534 supply or stop the driving pulse DP1 to the driving elements 300_1 to 300_4 by turning on or off in response to the control signals S1 to S4.

In addition, a signal having a waveform that does not directly contribute to ejection may be applied to the driving element 300 that is not driven. The "waveform that does not directly contribute to ejection" means a small waveform such that the liquid is not ejected from the nozzle 200 even when the waveform is applied to all of the driving elements 300 corresponding to the nozzle 200. Such a waveform may be a micro-vibration waveform that is continuously applied during the non-ejection period, and may be a dedicated waveform applied to the driving element 300 which is not used for ejection in accordance with the driving timing of the driving element 300 used for ejection in order to reduce a reverse flow of liquid to the pressure chamber 330 not used for ejection. In the present disclosure, the term "driving pulse" means a signal including a waveform that directly contributes to ejection, not a signal that includes only a waveform that does not directly contribute to ejection.

FIG. 9 is an explanatory diagram illustrating an ejection mode according to the first embodiment. In each line of FIG. 9, for each mode, the classification of the first ejection mode EM1 or the second ejection mode EM2, the mode ID, the number of driving pressure chambers Ncav, and the ON/OFF state of the control signals S1 to S4, and the droplet amount Iv are illustrated.

The control section 450 can selectively execute the first ejection mode EM1 in which all four driving elements 300_1 to 300_4 are driven to eject a liquid from the nozzle 200, and the second ejection mode EM2 in which only some of the four driving elements 300_1 to 300_4 are driven to eject a liquid from the nozzle 200. The second ejection mode EM2 includes a plurality of modes.

The mode ID is obtained by coupling the "number indicating a mode classification", the "number of driving pressure chambers Ncav", and the "sub number" for each mode with an underscore. For example, the mode ID of the uppermost mode in FIG. 9 is 1_4_1, which indicates that the mode classification is the first ejection mode EM1, the number of driving pressure chambers Ncav is 4, and the sub number is 1. The sub number is the number for distinguishing a plurality of modes in which the mode classification and the number of driving pressure chambers Ncav are common.

The ON/OFF states of the control signals S1 to S4 indicate the ON/OFF states of the four driving elements 300_1 to 300_4. In other words, the ON/OFF state of the control signals S1 to S4 indicates which of the four pressure chambers 330_1 to 330_4 is to be driven. The number of driving pressure chambers Ncav is the number of pressure chambers to be driven. The droplet amount Iv is an example of the droplet amount ejected in each mode. In this example, the droplet amount Iv has nine different values ranging from 0.5 [pl] to 12 [pl]. [pl] means picoliter. When all of these modes are used, ten gradations can be reproduced at one dot position, including gradations without dots. These ten gradations are represented by the dot size signal Sd.

In addition, a mode other than the mode illustrated in FIG. 9 may be used. For example, although only two modes 2_3_1 and 2_3_2 are described as modes for driving the three pressure chambers 330, a mode for driving the three pressure chambers 330 different from these may be used. The same applies to the mode of driving only one pressure chamber 330. However, the control section 450 may be configured to use only some of these modes.

Six modes 2_2_1 to 2_2_6 are described as modes for driving the two pressure chambers 330. These modes are partial drive modes in which only two of the four pressure chambers 330_1 to 330_4 are driven to eject a liquid from the nozzle 200. In the mode 2_2_1, the first pressure chamber 330_1 and the fourth pressure chamber 330_4 are driven. In the mode 2_2_2, the second pressure chamber 330_2 and the third pressure chamber 330_3 are driven. As described with reference to FIG. 8, the driving elements 300_1 and 300_4 of the first pressure chamber 330_1 and the fourth pressure chamber 330_4 are positioned on the diagonal line DL1 of a quadrangle having the centers of each of the four pressure chambers 330_1 to 330_4 as the vertices. Similarly, the driving elements 300_2 and 300_3 of the second pressure chamber 330_2 and the third pressure chamber 330_3 are also positioned on the diagonal line DL2 of a quadrangle having the centers of each of the four pressure chambers 330_1 to 330_4 as the vertices. Further, the first pressure chamber 330_1 and the fourth pressure chamber 330_4 are two pressure chambers of the four pressure chambers 330_1 to 330_4 in which the flow path length to the nozzle 200 is shorter than that of the other pressure chambers.

The control section 450 may use only one of the two modes 2_2_1 and 2_2_2 having the greater droplet amount Iv, or both of the two modes 2_2_1 and 2_2_2 among the six modes 2_2_1 to 2_2_6 having two driving pressure chambers Ncav. The first two modes 2_2_1 and 2_2_2 are preferable in that the droplet amount Iv is large. The reason why the droplet amount Iv is large is that the pressure wave can be evenly transmitted from both sides of the nozzle 200, such that the ejection efficiency is good. Specifically, for example, when driving only the driving elements 300_1 and 300_2 corresponding to the two pressure chambers 330_1 and 330_2 arranged on one side of the second direction Dr2 with respect to the nozzle 200 as in mode 2_2_5, the pressure wave generated by driving the driving elements 300_1 and 300_2 is transmitted to the two pressure chambers 330_3 and 330_4 arranged on the other side of the second direction Dr2 with respect to the nozzle 200 via the communication flow path 350, and thus the discharge efficiency is poor. On the other hand, in the mode 2_2_1 and the mode 2_2_2, the pressure wave transmitted from either the pressure chamber 330_1 or the pressure chamber 330_2 toward the nozzle 200 and the pressure wave transmitted from either the pressure chamber 330_3 or the pressure chamber 330_4 toward the nozzle 200 can be joined in the vicinity of the nozzle 200, and thus the discharge efficiency can be improved.

The ejection control using only the mode 2_2_1 out of the two modes 2_2_1 and 2_2_2 has the following features.

Feature M1

The partial drive mode in which only two driving elements 300 among the four driving elements 300_1 to 300_4 are driven to eject a liquid from the nozzle 200, includes a mode in which only the two driving elements 300_1 and 300_4 corresponding to the two pressure chambers 330_1 and 330_4, which have shorter flow path lengths from the nozzle 200 than those of the other pressure chambers, among the four pressure chambers 330_1 to 330_4 are driven to eject a liquid from the nozzle 200.

According to this feature M1, since the flow path resistance from the pressure chamber 330_1 to the nozzle 200 and the flow path resistance from the pressure chamber 330_4 to the nozzle 200 are small, there is an advantage that attenuation of the pressure waves from each of the pressure chambers 330_1 and 330_4 toward the nozzle 200 is reduced, and the discharge efficiency can be improved.

The ejection control using at least one of the two modes 2_2_1 and 2_2_2 has the following features.

Feature M2

The second ejection mode EM2 includes a partial drive mode in which only two driving elements among the four driving elements 300_1 to 300_4 are driven to eject a liquid from the nozzle 200. This partial drive mode includes a mode in which the driving elements 300 corresponding to the two pressure chambers 330 positioned on the diagonal lines DL1 and DL2 of a quadrangle having the centers of each of the four pressure chambers 330_1 to 330_4 as the vertices are driven to eject a liquid from the nozzle 200, in plan view in the ejection direction.

The above-described feature M2 can also be grasped as the following feature M3.

Feature M3

The nozzle 200 overlaps the intersection of the straight line DL1 coupling the first pressure chamber 330_1 and the fourth pressure chamber 330_4, and the straight line DL2 coupling the second pressure chamber 330_2 and the third pressure chamber 330_3 in plan view of the ejection direction, and the second ejection mode EM2 drives the first driving element 300_1 and the fourth driving element 300_4, or the second driving element 300_2 and the third driving element 300_3.

The ejection control using both of the two modes 2_2_1 and 2_2_2 has the following features.

Feature M4

The second ejection mode EM2 includes the mode 2_2_1 in which only two driving elements 300_1 and 300_4 among the four driving elements 300_1 to 300_4 are driven to eject a liquid from the nozzle 200, and the mode 2_2_2 in which only the two driving elements 300_2 and 300_3 different from the two driving elements 300_1 and 300_4 are driven to eject a liquid from the nozzle 200.

According to this feature M4, two different values can be realized as the droplet amount Iv when the two driving elements 300 are used, and thus the gradation reproducibility of dots can be improved.

As can be understood from the above description, in the mode in which the number of driving pressure chambers Ncav is two, it is preferable to drive the two pressure chambers 330 having the same flow path length up to the nozzle 200. In addition, it is preferable to select one pressure chamber 330 from one side and one from the other side of the nozzle array NL. This is particularly effective when the communication flow path 350 common to the four pressure chambers 330 is long in the second direction Dr2 orthogonal to the first direction Dr1 which is the direction of the nozzle array NL. Furthermore, it is preferable to drive the two pressure chambers 330 arranged on any one of the diagonal lines DL1 and DL2 of a quadrangle having the centers of each of the four pressure chambers 330_1 to 330_4 as the vertices.

The user can use the input receiving section 460 to set whether to use a low image quality mode or a high image quality mode as the image quality mode relating to the image quality of the image recorded on the medium PM by ejecting the liquid. At this time, the ejection control preferably has the following feature.

Feature M5

When the low image quality mode is selected, the control section 450 executes only the first ejection mode EM1, and when the high image quality mode is selected, only the second ejection mode EM2 or both of the first ejection mode EM1 and the second ejection mode EM2 are executed.

According to this feature M5, printing with an emphasis on printing speed and printing with an emphasis on gradation reproducibility can be selectively executed. Instead of selection of the image quality mode by the user using the input receiving section 460, selection of the image quality mode by the control section 450 in response to a selection instruction included in the image data may be performed.

The ejection control may further have the following features.

Feature M6

The control section 450 executes the first ejection mode EM1 when the viscosity of the liquid is the first value, and executes the second ejection mode EM2 when the viscosity of the liquid is the second value lower than the first value.

According to this feature M6, it is possible to reduce the power consumption by switching the ejection mode according to the state of the viscosity. In particular, when UV ink or oil-based ink is used, the viscosity is high at a low temperature and the energy required for ejection is large. Therefore, it is preferable to change the ejection mode according to the viscosity. In addition, when pseudoplastic ink is used, the viscosity changes according to the flow speed. Therefore, in the high viscosity state immediately after the start of ink circulation, the first ejection mode EM1 is executed, and in the low viscosity state after a while from the start of ink circulation, the second ejection mode EM2 may be executed.

The viscosity of the liquid can be determined or estimated using various methods as follows. The first method is a method in which the user inputs viscosity information of the liquid using the input receiving section 460. The second method is a method in which the control section 450 automatically determines the type of the liquid from the IC chip provided in the liquid storage section 420, and determines the viscosity according to the type. In this case, it is preferable to determine the viscosity from the relationship between the temperature and the viscosity by using the temperature of the liquid measured by using a temperature sensor (not illustrated). A third method is a method of detecting viscosity in real time by using the viscosity detecting means described in JP-A-2020-44804 disclosed by the applicant of the present disclosure.

The user can further set the distance PG between the medium PM and the nozzle 200 illustrated in FIG. 3 using the input receiving section 460. At this time, the ejection control preferably has the following feature.

Feature M7

The control section 450 executes the first ejection mode EM1 when the distance PG between the medium PM and the nozzle 200 is the first distance, and executes only the second ejection mode EM2 or both of the first ejection mode EM1 and the second ejection mode EM2 when the distance PG is the second distance shorter than the first distance.

According to this feature M7, since the second ejection mode EM2 has a less droplet amount Iv than the first ejection mode EM1, a large distance PG between the medium PM and the nozzle 200 is easily affected by the air flow, but by appropriately switching the mode according to the distance PG, it is possible to suppress printing defects due to the influence of the air flow.

The input receiving section 460 may receive the input of the mode selected by the user from a plurality of modes including the first ejection mode EM1 and the second ejection mode EM2. In this manner, the user can select the mode the user wants to use.

According to the head driving method in the first embodiment described above, by applying at least some of the above-described features M1 to M7, the gradation reproducibility can be improved by using the first ejection mode EM1 and the second ejection mode EM2. Further, in the first ejection mode EM1 and the second ejection mode EM2, the gradation reproducibility can be improved even in a configuration in which the same driving pulse DP1 generated by the same driving signal generation circuit 520 is supplied to each of the driving elements 300_1 to 300_4, and thus by providing a plurality of driving signal generation circuits that generate different driving pulses, the cost can be reduced compared to the case of improving the gradation reproducibility.

In the above-described first embodiment, the driving signal including only one type of driving pulse DP1 is used, but instead, a driving signal including a plurality of types of driving pulses having different droplet amounts Iv may be used. When such a driving signal is used, the number of gradations that can be reproduced with one dot can be further increased. This also applies to the other embodiments described below.

C. Other Embodiments

Figure 10:
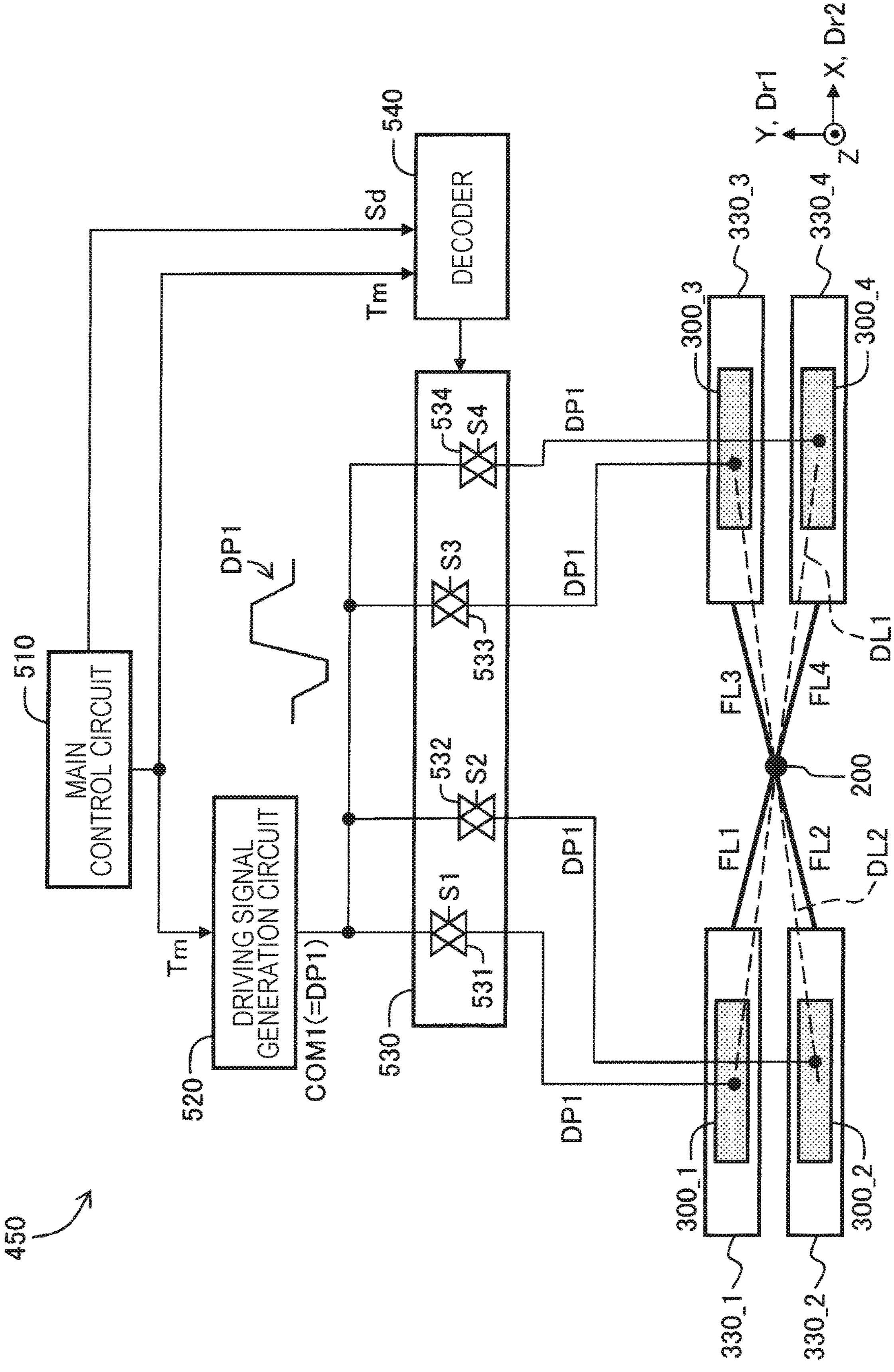
FIG. 10 is an explanatory diagram illustrating a head drive function of the control section according to a second embodiment.

FIG. 10 is an explanatory diagram illustrating a head drive function of the control section 450 according to the second embodiment. The second embodiment is mainly different from the first embodiment described above only in the positional relationship between the plurality of pressure chambers 330_1 to 330_4 in plan view in the Z direction, and has other apparatus configurations and control operations, which are substantially the same as those of the first embodiment.

In the first embodiment described with reference to FIG. 8, the plurality of pressure chambers 330_1 to 330_4 are arranged in a staggered pattern, but in the second embodiment, the plurality of pressure chambers 330_1 to 330_4 are not arranged in a staggered pattern. That is, the first pressure chamber 330_1 and the third pressure chamber 330_3 are arranged at the same position with respect to the first direction Dr1. The second pressure chamber 330_2 and the fourth pressure chamber 330_4 are also arranged at the same position with respect to the first direction Dr1. In the second embodiment, the flow path lengths FL1 to FL4 from the pressure chamber 330_1 to the pressure chamber 330_4 to the nozzle 200 are all the same.

FIG. 11 is an explanatory diagram illustrating an ejection mode according to the second embodiment. The ON/OFF state of the driving element 300 in each mode is the same as the mode of the first embodiment illustrated in FIG. 9, but the droplet amount Iv is different from that of the first embodiment. In the example of FIG. 11, the droplet amount Iv has six different values ranging from 1 [pl] to 12 [pl]. For example, the droplet amount Iv of the two modes 2_2_1 and 2_2_2 is the same at 5 [pl]. The reason why the droplet amount Iv is different from that of the first embodiment is that the flow path lengths FL1 to FL4 are all the same in the second embodiment. When all of the plurality of modes illustrated in FIG. 11 are used, seven gradations can be reproduced at one dot position, including gradation without dots.

The features M1 to M7 described in the first embodiment can also be applied to the second embodiment, and have substantially the same effects as those of the first embodiment.

In the second embodiment, since the droplet amounts Iv of the two modes 2_2_1 and 2_2_2 used in the above feature M4 are the same, the same gradation is reproduced regardless of which mode is used. When the feature M4 is applied in the second embodiment, when the modes for driving the two driving elements 300 are continuously executed, it is preferable to periodically switch between the two modes 2_2_1 and 2_2_2, and in particular, it is preferable to alternately switch between the two modes each time the droplets are discharged from the nozzle 200. In this manner, the life of the driving element 300 can be extended as compared with the case where only the same two driving elements 300 are continuously driven.

Figure 12:
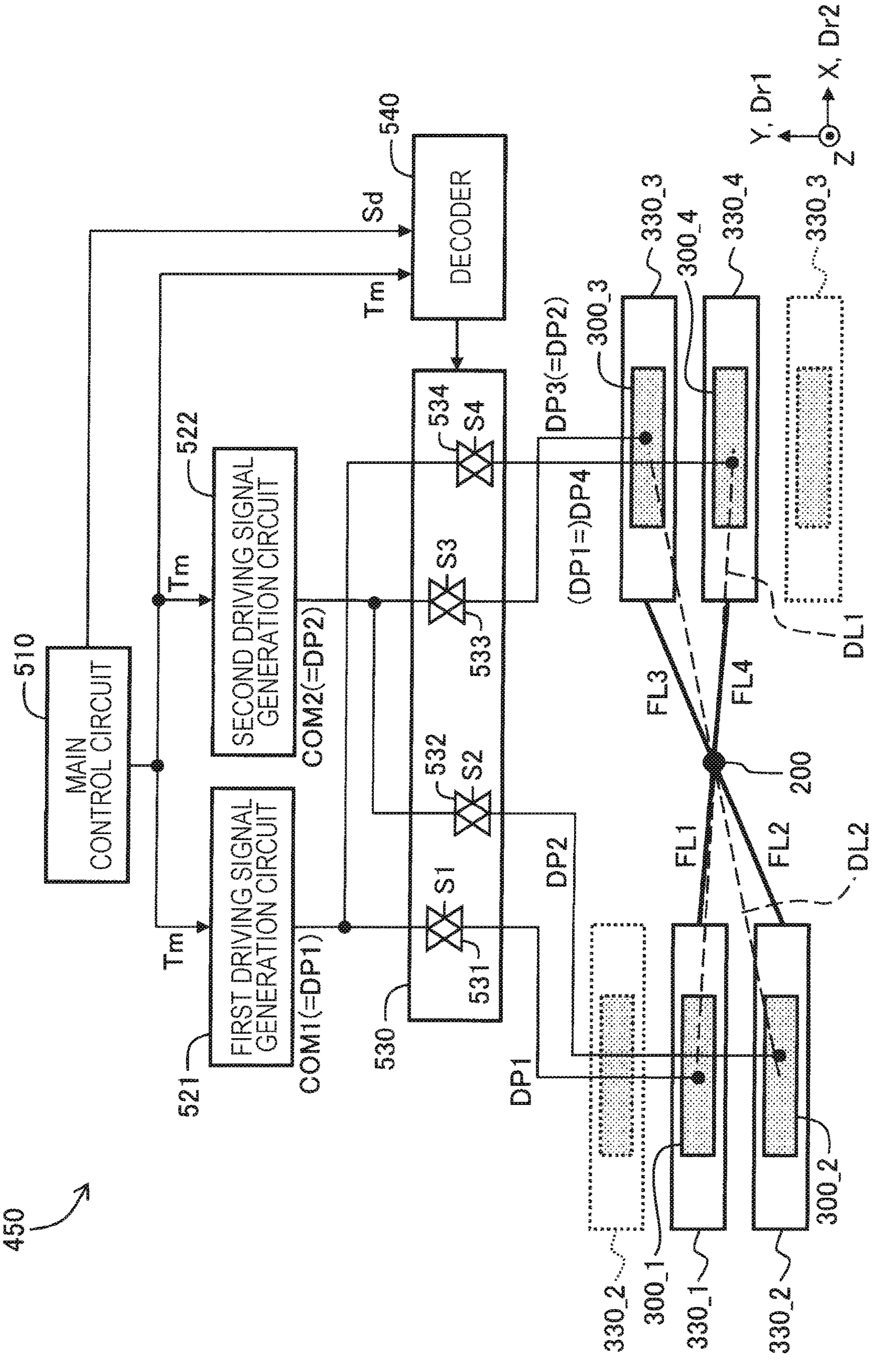
FIG. 12 is an explanatory diagram illustrating a head drive function of a control section according to a third embodiment.

FIG. 12 is an explanatory diagram illustrating a head drive function of the control section 450 according to the third embodiment. The third embodiment is mainly different from the first embodiment described above in that the two driving signal generation circuits 521 and 522 are provided and in that the driving pulses DP1 and DP2 generated by the driving signal generation circuits 521 and 522 are distributed to the four driving elements 300_1 to 300_4, and has other apparatus configurations and control operations, which are substantially the same as those of the first embodiment.

The first driving signal generation circuit 521 and the second driving signal generation circuit 522 generate a first common driving signal COM1 and a second common driving signal COM2 to be given to the driving element 300, respectively, and supply the signals to the switch circuit 530. The first common driving signal COM1 includes a first driving pulse DP1, and the second common driving signal COM2 includes a second driving pulse DP2. Examples of the driving pulses DP1 and DP2 will be described later. The first common driving signal COM1 is supplied to the input terminals of the two analog switches 531 and 534, and the second common driving signal COM2 is supplied to the input terminals of the other two analog switches 532 and 533. The analog switches 531 to 534 supply or stop the driving pulses DP1 and DP2 to the driving elements 300_1 to 300_4 by turning on or off in response to the control signals S1 to S4. In addition, the third driving pulse DP3 supplied to the third driving element 300_3 is the same as the second driving pulse DP2 supplied to the second driving element 300_2. Further, the fourth driving pulse DP4 supplied to the fourth driving element 300_4 is the same as the first driving pulse DP1 supplied to the first driving element 300_1. A third driving signal generation circuit that generates a third common driving signal including the third driving pulse DP3 and a fourth driving signal generation circuit that generates a fourth common driving signal including the fourth driving pulse DP4 may be provided.

Figure 13:
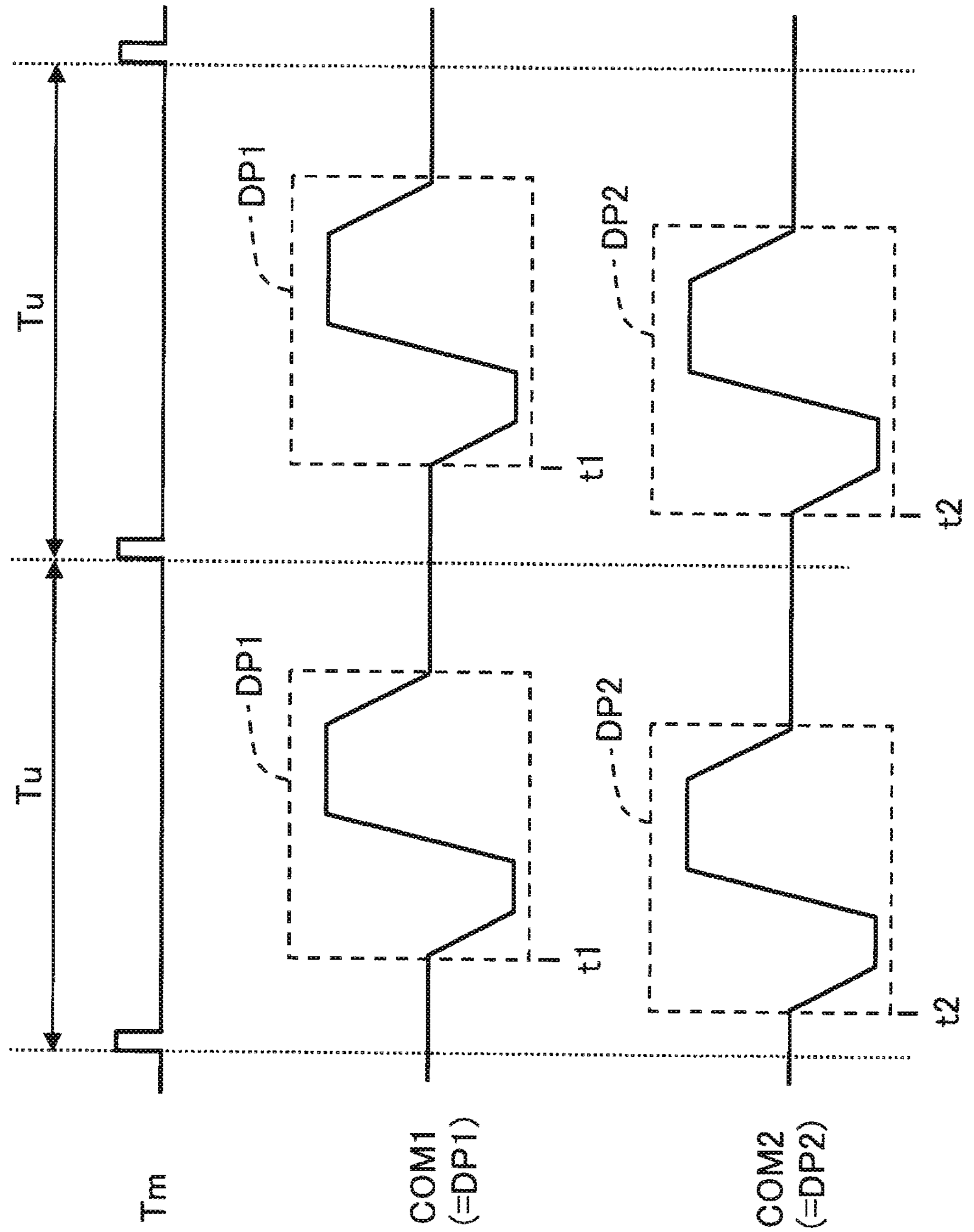
FIG. 13 is a timing chart illustrating a relationship between a common driving signal and a driving pulse.

FIG. 13 is a timing chart illustrating the relationship between the common driving signals COM1 and COM2 and the driving pulses DP1 and DP2. The first common driving signal COM1 is a signal in which the first driving pulse DP1 is periodically generated for each constant unit period Tu (control period) in synchronization with the timing signal Tm. Similarly, the second common driving signal COM2 is a signal in which the second driving pulse DP2 is periodically generated for each constant unit period Tu in synchronization with the timing signal Tm. The driving timing t1 of the first driving pulse DP1 and the driving timing t2 of the second driving pulse DP2 generated in one unit period Tu are set to be shifted from each other. In other words, the drive cycles of the two common driving signals COM1 and COM2 are set to be shifted from each other.

Figure 14:
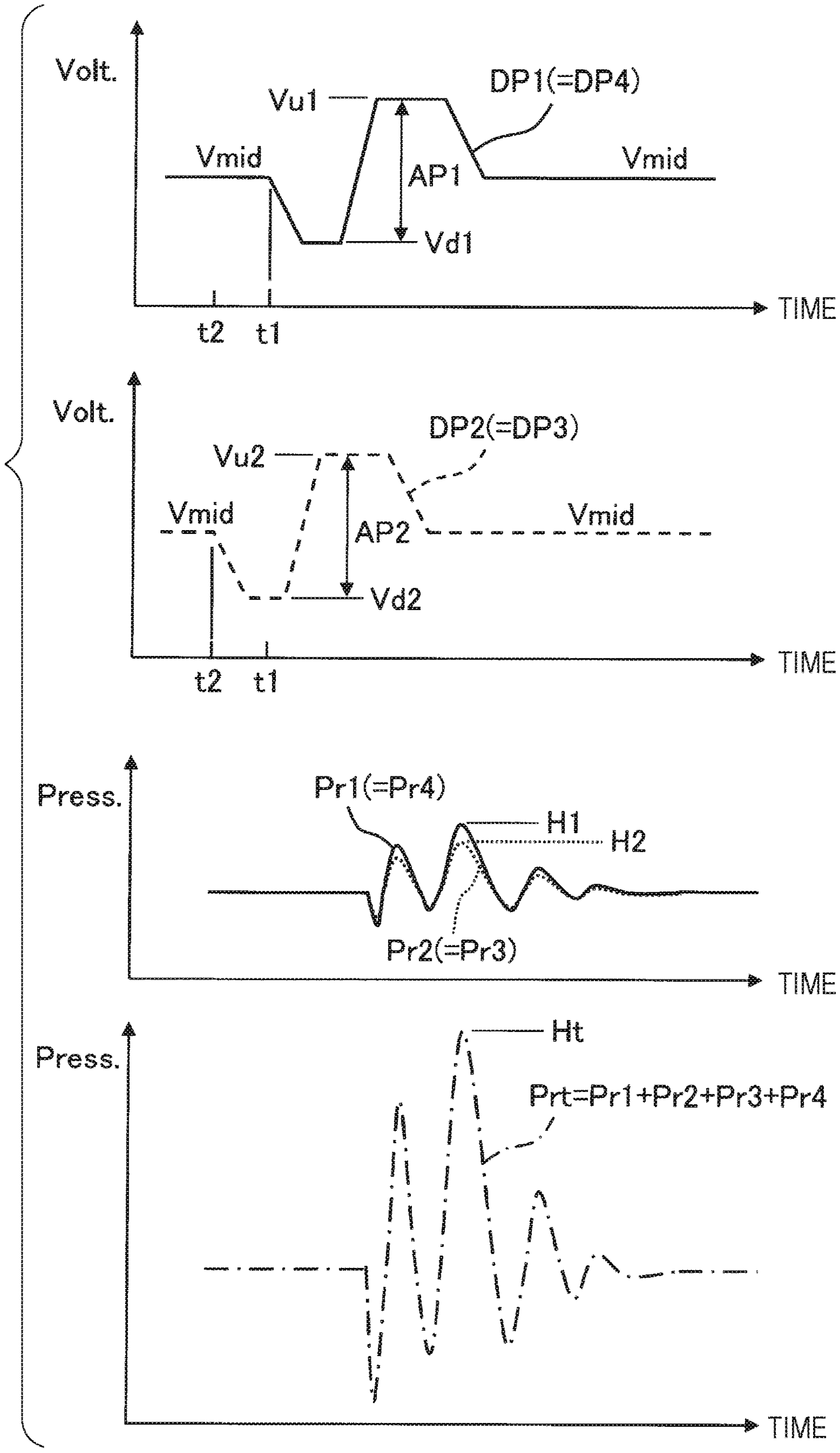
FIG. 14 is a graph illustrating Example 1 of the driving pulse and a pressure change according to the third embodiment.

FIG. 14 is a graph illustrating Example 1 of the driving pulses DP1 to DP4 in the third embodiment and pressure changes Pr1, Pr2, and Prt caused by these pulses. The first driving pulse DP1 is supplied to the first driving element 300_1 of the first pressure chamber 330_1 having the short flow path length FL1, and the second driving pulse DP2 is supplied to the second driving element 300_2 of the second pressure chamber 330_2 having the long flow path length FL2.

The first driving pulse DP1 drops substantially linearly from an intermediate potential Vmid at the driving timing t1, and is held for a certain period of time when reaching a lower end potential Vd1. Then the potential rises substantially linearly, and is held for a certain period of time when reaching an upper end potential Vu1. After this, the potential drops substantially linearly again, and returns to the intermediate potential Vmid, which makes a trapezoidal waveform shape. An amplitude AP1 of the first driving pulse DP1 is the difference between the upper end potential Vu1 and the lower end potential Vd1. The potential drop part after the driving timing t1 is a part that performs an operation of pulling the vibrating plate 310 in the −Z direction. Further, the potential rise part where the potential rises from the lower end potential Vd1 is a part that performs an operation of pushing out the vibrating plate 310 in the +Z direction. The pressure wave in the first pressure chamber 330_1 is generated in response to the potential rise part.

The second driving pulse DP2 has the same waveform shape as the first driving pulse DP1, and is generated at the driving timing t2 earlier than the driving timing t1 of the first driving pulse DP1. The intermediate potential Vmid, the lower end potential Vd2, the upper end potential Vu2, and the amplitude AP2 of the second driving pulse DP2 are the same as the intermediate potential Vmid, the lower end potential Vd1, the upper end potential Vu1, and the amplitude AP1 of the first driving pulse DP1, respectively. The shapes of the driving pulses DP1 and DP2 illustrated in FIG. 14 are examples, and various other shapes of driving pulses can be used.

The pressure changes Pr1 and Pr2 illustrated in the third-stage graph of FIG. 14 individually indicate changes in internal pressure generated at the position of the nozzle 200 by the pressure wave generated in the pressure chambers 330_1 and 330_2 in response to the two driving pulses DP1 and DP2. The two pressure changes Pr1 and Pr2 have substantially the same shape, and peak heights H1 and H2 thereof are different from each other. The peak height H2 is less than the peak height H1. The pressure change Prt illustrated in the fourth-stage graph of FIG. 14 indicate the sum of changes in internal pressure generated at the position of the nozzle 200 by the pressure wave generated in the four pressure chambers 330_1 to 330_4 in response to the four driving pulses DP1 and DP4. The peak height Ht of the pressure change Prt is approximately four times the peak heights H1 and H2 of the pressure changes Pr1 and Pr2. In this example, since the peaks of the pressure changes Pr1 and Pr2 are generated at substantially the same timing, the pressure change Prt of the communication flow path 350 at the position of the nozzle 200 can be efficiently increased. As a result, the ejection efficiency of the liquid can be improved.

The driving method using Example 1 of the driving pulses DP1 to DP4 illustrated in FIG. 14 has the following features.

Feature Mp1

The driving timing of the second driving element 300_2 is earlier than the driving timing of the first driving element 300_1, and the driving timing of the third driving element 300_3 is earlier than the driving timing of the fourth driving element 300_4.

The above-described feature Mp1 can also be grasped as the following feature Mp2.

Feature Mp2

The timing at which the second driving pulse DP2 is applied to the second driving element 300_2 is earlier than the timing at which the first driving pulse DP1 is applied to the first driving element 300_1, and the timing at which the third driving pulse DP3 is applied to the third driving element 300_3 is earlier than the timing at which the fourth driving pulse DP4 is applied to the fourth driving element 300_4.

It is preferable that the timing at which each of the driving pulses DP1 to DP4 is applied to each of the driving elements 300_1 to 300_4 be set such that the pressure waves generated by driving the driving elements 300_1 to 300_4 increase the pressure at the position of the nozzle 200 without canceling each other out. As an example, whether or not the two pressure waves generated by driving the two driving elements 300_1 and 300_2 increase the pressure without canceling each other out is can be determined by comparing a first liquid amount of the liquid ejected from the nozzle 200 when the two driving elements 300_1 and 300_2 are driven, and a second liquid amount of the liquid ejected from the nozzle 200 when driving only one driving element 300_1. That is, when the first liquid amount is equal to or less than the second liquid amount, it can be determined that the two pressure waves generated by driving the two driving elements 300_1 and 300_2 cancel each other out. On the other hand, when the first liquid amount is greater than the second liquid amount, it can be determined that the two pressure waves generated by driving the two driving elements 300_1 and 300_2 increase the pressure without canceling each other out. It is preferable to adjust the timings of the driving pulses DP1 and DP2 such that the first liquid amount is 1.5 times or more the second liquid amount. Further, when the four driving elements 300_1 to 300_4 are driven as in FIG. 8, it is preferable to adjust the timings of the driving pulses DP1 to DP4 such that the first liquid amount of the liquid ejected from the nozzle 200 when the four driving elements 300 are driven is three times or more the second liquid amount of the liquid ejected from the nozzle 200 when only one driving element 300_1 is driven.

In addition, when adjusting the driving timings of the driving pulses DP1 and DP2 such that the liquid amount when the driving pulses DP1 and DP2 are supplied to the driving elements 300_1 to 300_4 is greater than the liquid amount when the same driving pulse DP1 is supplied to each of the driving elements 300_1 to 300_4, it is possible to obtain a composite wave in which peaks of the pressure wave are combined with each other at the same timing, and to improve the ejection efficiency.

Figure 15:
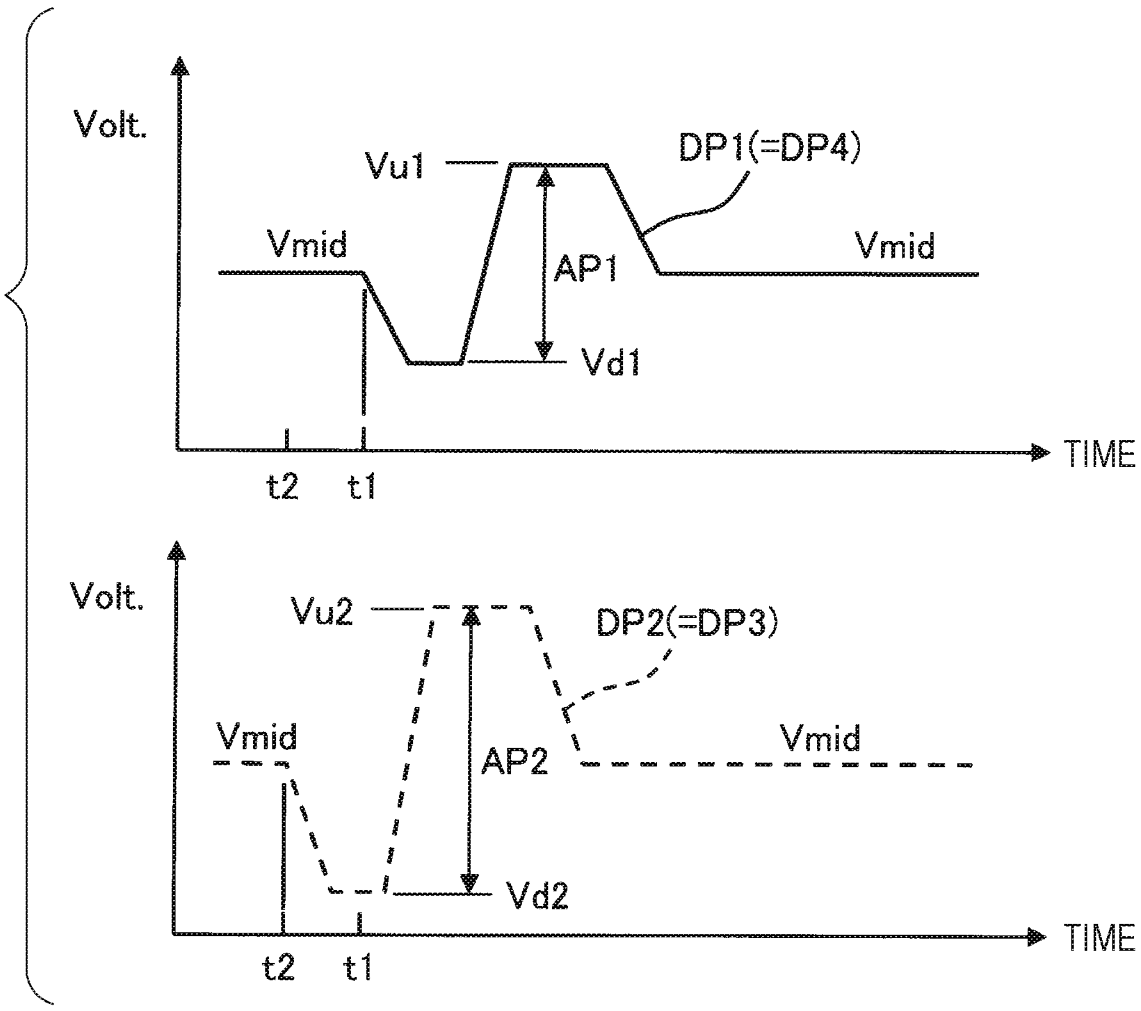
FIG. 15 is a graph illustrating Example 2 of the driving pulse according to the third embodiment.

FIG. 15 is a graph illustrating Example 2 of the driving pulses DP1 to DP4. The difference between Example 2 and Example 1 illustrated in FIG. 14 is only the waveform of the second driving pulse DP2, and the first driving pulse DP1 is the same as Example 1. Note that, in FIG. 15, the graph of the pressure change is omitted.

The driving method using the driving pulses DP1 to DP4 of Example 2 has the following features.

Feature Mp3

The amplitude AP2 of the second driving pulse DP2 is greater than the amplitude AP1 of the first driving pulse DP1, and the amplitude of the third driving pulse DP3 is greater than the amplitude of the fourth driving pulse DP4.

For example, the lower end potential Vd2 of the second driving pulse DP2 is set lower than the lower end potential Vd1 of the first driving pulse DP1, and the upper end potential Vu2 of the second driving pulse DP2 is set higher than the upper end potential Vu1 of the first driving pulse DP1.

The reason for adopting the above-described feature Mp3 is to eliminate the difference in the attenuation amount in a case where the difference cannot be ignored, when considering the attenuation amount at which the pressure waves generated in each of the four pressure chambers 330_1 to 330_4 are attenuated before reaching the position of the nozzle 200. In the example of FIG. 8, since the flow path lengths FL2 and FL3 from the two pressure chambers 330_2 and 330_3 to the nozzle 200 are longer than the flow path lengths FL1 and FL4 from the other two pressure chambers 330_1 and 330_4 to the nozzle 200, it is assumed that the attenuation amount of the pressure wave generated in the two pressure chambers 330_2 and 330_3 becomes large to the extent that the attenuation amount cannot be ignored. In this case, by adopting the above-described feature Mp3, it is possible to eliminate the difference in the attenuation amount of the pressure wave. That is, the pressure changes generated at the positions of the nozzles 200 due to the pressure waves of the four pressure chambers 330_1 to 330_4 can be made substantially the same, and the ejection efficiency can be improved. When the peak height of the pressure change generated at the position of the nozzle 200 according to the first driving pulse DP1 is set to 100%, it is preferable to adjust the amplitude AP2 of the second driving pulse DP2 such that the peak height of the pressure change generated at the position of the nozzle 200 according to the second driving pulse DP2 falls within the range of 100±5%.

The relationship between the difference in the attenuation amount of the pressure wave and the ejection efficiency of the liquid can be understood as follows. For example, when the same pressure change is generated in the first pressure chamber 330_1 and the second pressure chamber 330_2 having different flow path lengths, at the position of the nozzle 200, the amplitude of the pressure wave of the second pressure chamber 330_2 having a longer flow path length further decreases. Therefore, the pressure wave from the first pressure chamber 330_1 is transmitted toward the second pressure chamber 330_2, which may cause a concern that the ejection efficiency decreases. However, by making the pressure change generated in the second pressure chamber 330_2 having a long flow path length greater than that in the first pressure chamber 330_1, it is possible to suppress transmission of the pressure wave from the first pressure chamber 330_1 toward the second pressure chamber 330_2, and to improve ejection efficiency.

The above-described feature Mp3 can also be understood as the following features.

Feature Mp4

The magnitude of the pressure change of the liquid in the second pressure chamber 330_2 generated by driving the second driving element 300_2 is greater than the magnitude of the pressure change of the liquid in the first pressure chamber 330_1 generated by driving the first driving element 300_1. Similarly, the magnitude of the pressure change of the liquid in the third pressure chamber 330_3 generated by driving the third driving element 300_3 is greater than the magnitude of the pressure change of the liquid in the fourth pressure chamber 330_4 generated by driving the fourth driving element 300_4.

Feature Mp5

The displacement amount of the second vibration section 312 of the vibrating plate 310 illustrated in FIG. 3 is greater than the displacement amount of the first vibration section 311, and the displacement amount of the third vibration section 313 is greater than the displacement amount of the fourth vibration section 314. Here, the displacement amount of the vibration section of the vibrating plate 310 is a difference between the position when the vibration section is displaced to the most +Z side and the position when the vibration section is displaced to the most −Z side, when the driving pulse DP1 or the driving pulse DP2 is applied.

The driving method using Example 2 of the driving pulses DP1 and DP2 illustrated in FIG. 15 may have a possibility of increasing the ejection efficiency of the liquid as compared with the driving method using Example 1 illustrated in FIG. 14.

Figure 16:
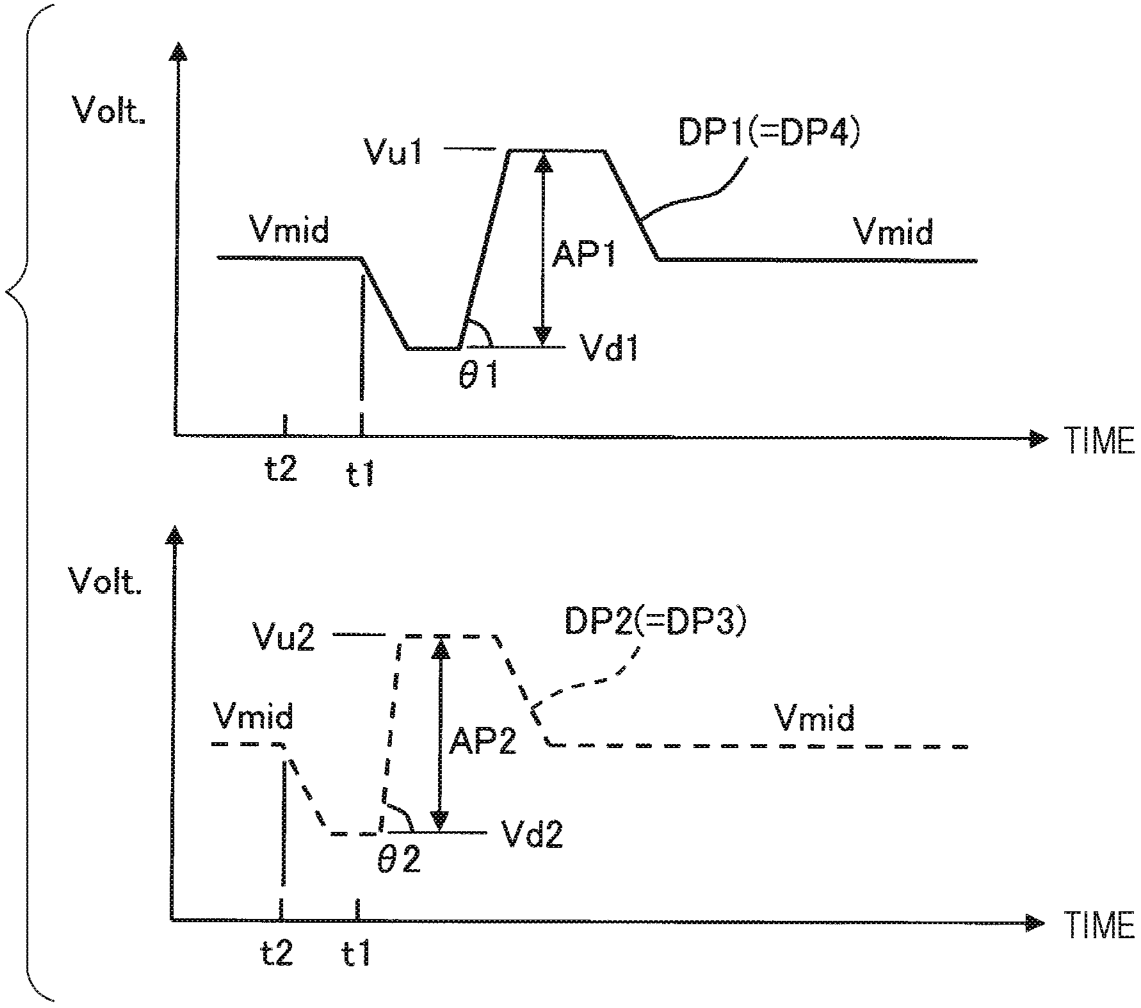
FIG. 16 is a graph illustrating Example 3 of the driving pulse according to the third embodiment.

FIG. 16 is a graph illustrating Example 3 of the driving pulses DP1 to DP4. The difference between Example 3 and Example 1 illustrated in FIG. 14 is only the waveform of the second driving pulse DP2, and the first driving pulse DP1 is the same as Example 1.

In the second driving pulse DP2 of Example 3, the inclination of the trapezoidal wave is set to be greater than that of the first driving pulse DP1. That is, the inclination θ1 of the potential rise part of the second driving pulse DP2 is set to be greater than the inclination θ1 of the potential rise part of the first driving pulse DP1. The amplitude AP2 of the second driving pulse DP2 is the same as the amplitude AP1 of the first driving pulse DP1. Further, the lower end potential Vd2 of the second driving pulse DP2 is the same as the lower end potential Vd1 of the first driving pulse DP1, and the upper end potential Vu2 of the second driving pulse DP2 is the same as the upper end potential Vu1 of the first driving pulse DP1. In addition, the driving timing t2 of the second driving pulse DP2 is earlier than the driving timing t1 of the first driving pulse DP1.

When a piezoelectric element is used as the driving element 300, the displacement speed of the vibrating plate 310 can be increased by increasing the inclination θ2 of the potential rise part of the trapezoidal wave as illustrated in FIG. 16. That is, the amplitude of the pressure wave can be increased by making the inclination θ2 of the waveform when the vibrating plate 310 is pushed out in the Z direction steep without increasing the amplitude AP2.

In addition, when a trapezoidal wave is used, the vibration of the driving element 300 tend to be started earlier as the inclination θ2 of the potential rise part is increased. Therefore, even when the driving timing t2 of the second driving pulse DP2 is set to be the same as the driving timing t1 of the first driving pulse DP1, it is possible to make the substantial driving timing of the second driving element 300_2 early. In consideration of this point, the driving timing t2 of the second driving pulse DP2 may be set to be the same as the driving timing t1 of the first driving pulse DP1. Also in this case, the driving timings t1 and t2 of the driving pulses DP1 and DP2 are preferable when the pressure waves generated by driving the driving elements 300_1 and 300_2 increase the pressure at the position of the nozzle 200 without canceling each other out.

Figure 17:
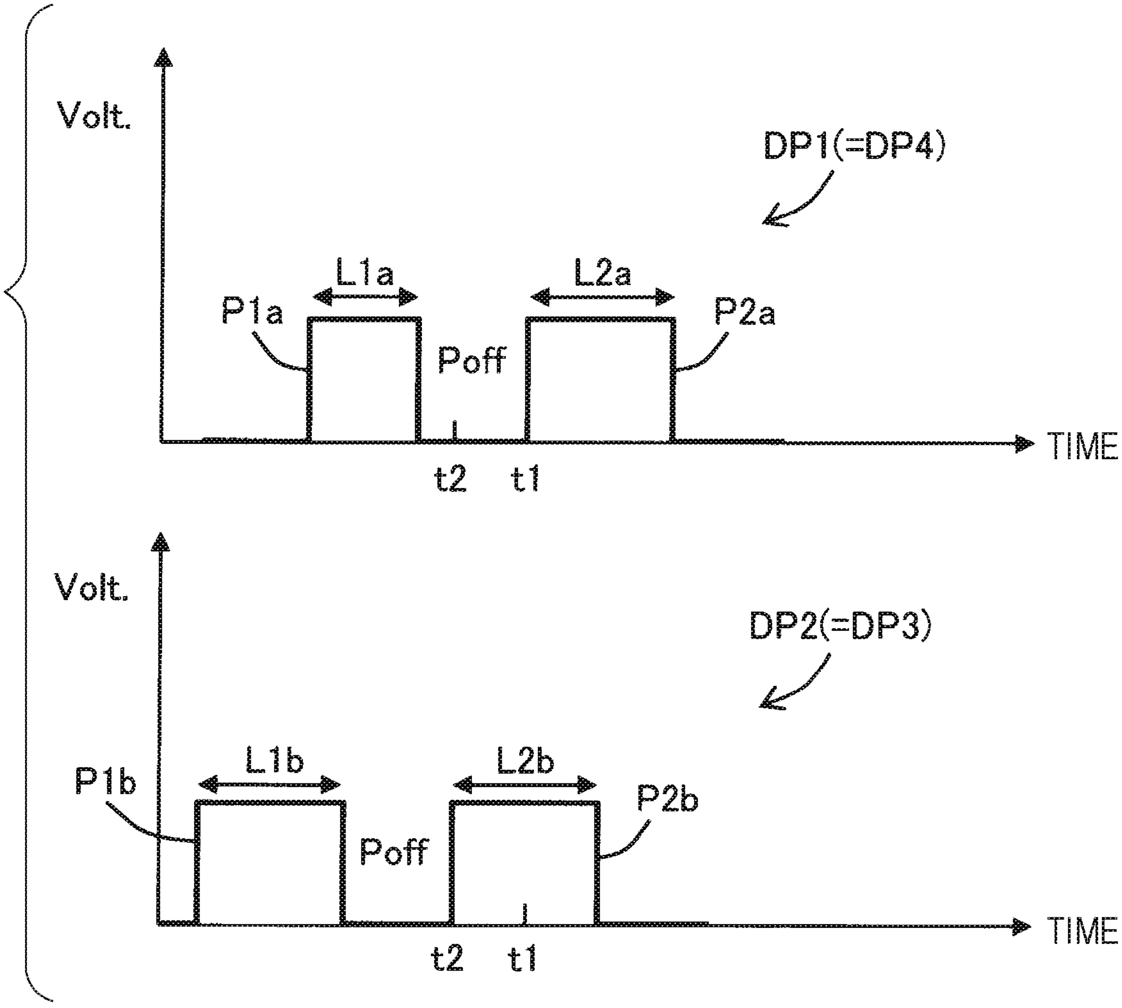
FIG. 17 is a graph illustrating Example 4 of the driving pulse according to the third embodiment.

FIG. 17 is a graph illustrating Example 4 of the driving pulses DP1 to DP4. These driving pulses DP1 to DP4 can be used when a heat generating element is used as the driving element 300 instead of the piezoelectric element. The first driving pulse DP1 is a pulse having a rectangular shape including a first pulse part P1*a* as a pre-pulse, a second pulse part P2*a* as a main pulse, and an off part Poff having a predetermined length therebetween. The first pulse part P1*a* is a part that controls the degree of film boiling of the liquid in the pressure chamber 330, and the second pulse part P2*a* is a part that becomes a trigger for ejecting the liquid in a state where the second pulse part P2*a* is film-boiled. Therefore, the rise timing of the second pulse part P2*a* is set as the ejection driving timing t1. Similarly to the first driving pulse DP1, the second driving pulse DP2 is also pulse having a rectangular shape including a first pulse part P1*b* as a pre-pulse, a second pulse part P2*b* as a main pulse, and an off part Poff having a predetermined length therebetween, and the rise timing of the second pulse part P2*b* is set as the ejection driving timing t2.

In the driving pulses DP1 and DP2 of Example 4, when the pulse widths of the first pulse parts P1*a* and P1*b* are lengthened, the film boiling becomes strong and the energy amount becomes large. On the other hand, since the second pulse parts P2*a* and P2*b* are merely triggers for ejection, there is almost no effect even when the pulse width is changed. Normally, the time width that can be used for one ejection is fixed. Therefore, for example, when the first pulse part P1*b* of the second driving pulse DP2 is lengthened, the second pulse part P2*b* is shortened by that amount, and the total length of the second driving pulse DP2 can be made constant. For example, in order to change the magnitude of the pressure change in the second pressure chamber 330_2, the width of the first pulse part P1*b* may be increased and the width of the second pulse part P2*b* may be shortened. Even in this case, when the peak height of the pressure change generated at the position of the nozzle 200 according to the first driving pulse DP1 is set to 100%, it is preferable to adjust the width of the first pulse part P1*b* such that the peak height of the pressure change generated at the position of the nozzle 200 according to the second driving pulse DP2 falls within the range of 100±5%.

Instead of adjusting the width of the first pulse part P1*b*, the number of times of the first pulse part P1*b* included in one driving pulse DP2 may be increased to increase the energy amount given to the liquid in the pressure chamber 330_2. Alternatively, similarly to the case of using the piezoelectric element, the energy amount given to the liquid in the pressure chamber 330_2 may be increased by increasing the voltage value of the first pulse part P1*b*.

The following features can be grasped from the examples of the driving pulses illustrated in FIGS. 14 to 17.

Feature Mp6

At least one of the timing and waveform of the driving pulses DP1 and DP2 is adjusted such that the pressure wave generated in the first pressure chamber 330_1 and the pressure wave generated in the second pressure chamber 330_2 increase the pressure at the position of the nozzle 200 without canceling each other out.

Feature Mp7

The waveforms of the driving pulses DP1 and DP2 are adjusted to eliminate the difference in the attenuation amount of the pressure wave caused by the difference in the flow path lengths FL1 and FL2. Specifically, when the peak height of the pressure change generated at the position of the nozzle 200 according to the first driving pulse DP1 is set to 100%, it is preferable to adjust the waveform such that the peak height of the pressure change generated at the position of the nozzle 200 according to the second driving pulse DP2 falls within the range of 100±5%.

As the ejection mode in the third embodiment, the same ejection mode as in the second embodiment described with reference to FIG. 11 can be used. Therefore, the third embodiment also has substantially the same effect as those of the first embodiment and the second embodiment. Further, according to the head driving method according to the third embodiment described above, by applying at least some of the above-described features Mp1 to Mp7, the shift of the pressure wave caused by the difference in the flow path lengths FL1 to FL4 from the nozzle 200 to the pressure chambers 330_1 to 330_4 is reduced, and the ejection efficiency can be improved.

Figure 18:
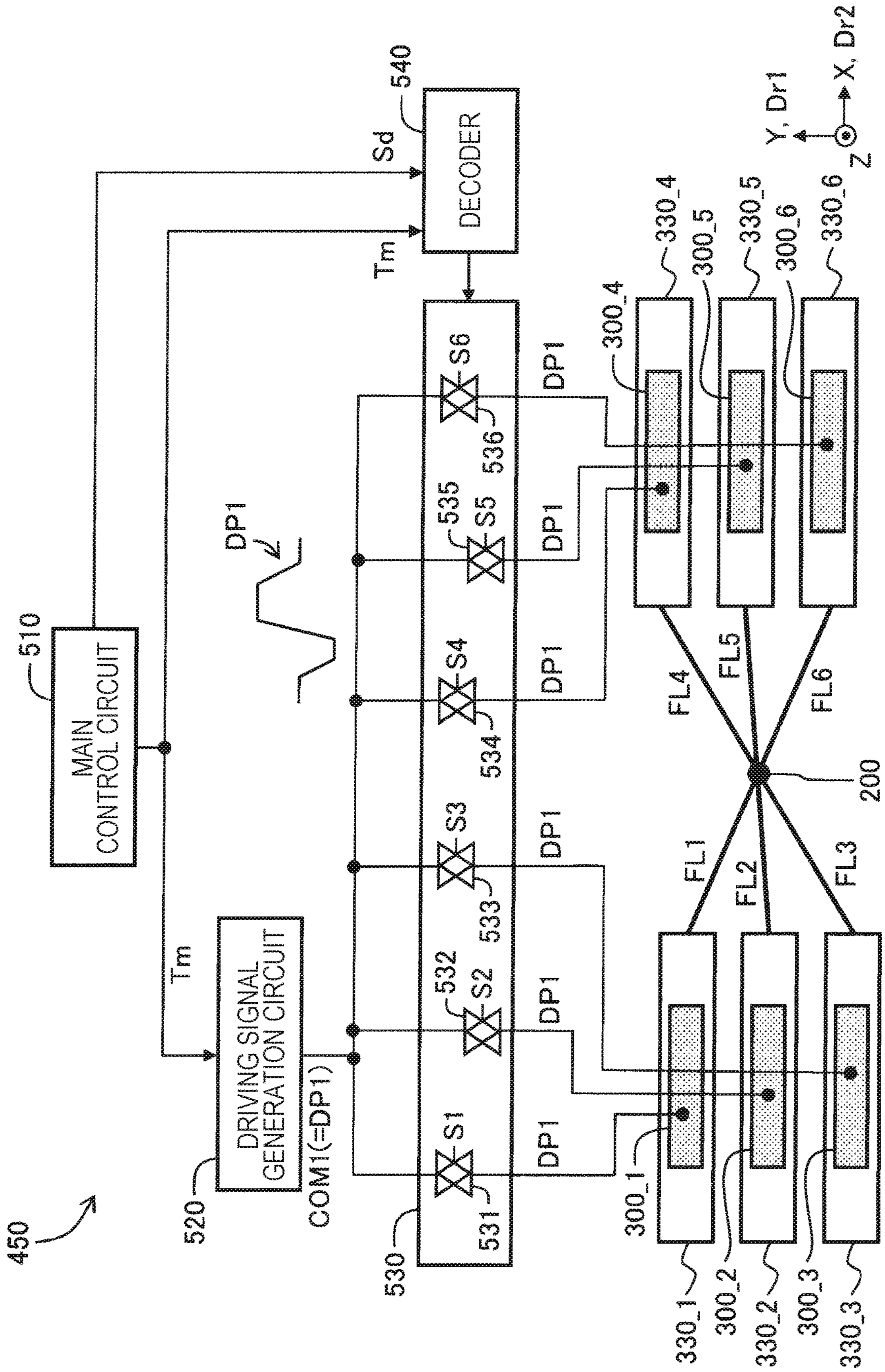
FIG. 18 is an explanatory diagram illustrating a head drive function of a control section according to a fourth embodiment.

FIG. 18 is an explanatory diagram illustrating a head drive function of the control section 450 according to the fourth embodiment. The fourth embodiment is mainly different from the first embodiment described above only in that the fifth pressure chamber 330_5 and the sixth pressure chamber 330_6 are added as pressure chambers communicating with the nozzle 200, and has other apparatus configurations and control operations, which are substantially the same as those of the first embodiment.

In plan view in the Z direction, the three pressure chambers 330_1 to 330_3 are arranged on the −X side, which is one side with respect to the nozzle 200, and the other three pressure chambers 330_4 to 330_6 are arranged on the +X side, which is the other side with respect to the nozzle 200. The plurality of pressure chambers 330_1 to 330_6 are arranged in a staggered pattern. That is, the pressure chambers 330_1 to 330_3 arranged on one side with respect to the nozzle 200 and the pressure chambers 330_4 to 330_6 arranged on the other side are arranged at positions where the positions thereof in the first direction Dr1 are shifted from each other. The same driving pulse DP1 is supplied to the driving elements 300_1 to 300_6 of the six pressure chambers 330_1 to 330_6.

In the fourth embodiment, the following formulas are satisfied for the flow path lengths FL1 to FL6 from the six pressure chambers 330_1 to 330_6 to the nozzle 200.

$$FL2<FL1<FL3 \quad (4a)$$

$$FL5<FL6<FL4 \quad (4b)$$

$$FL1=FL6 \quad (4c)$$

$$FL2=FL5 \quad (4d)$$

$$FL3=FL4 \quad (4e)$$

FIG. 19 is an explanatory diagram illustrating an ejection mode according to the fourth embodiment. In this example, the droplet amount Iv has ten different values ranging from 0.5 [pl] to 12 [pl]. When all of these plurality of modes are used, eleven gradations can be reproduced at one dot position, including gradations without dots. However, the control section 450 may be configured to use only some of these modes.

In the fourth embodiment, it is preferable that the ejection modes used by the control section 450 include a mode in which all six pressure chambers 330_1 to 330_6 are driven, a mode in which only four pressure chambers 330 are driven among the pressure chambers, and a mode in which only two pressure chambers 330 are driven. When these three modes are included, the gradation reproducibility of dots can be improved.

Further, as a mode for driving only the two pressure chambers 330, it is preferable to use a mode for driving the two pressure chambers 330 on a straight line passing through the nozzle 200. Specifically, it is preferable to use one or more modes out of the mode 2_2_1 in which the second pressure chamber 330_2 and the fifth pressure chamber 330_5 are driven, the mode 2_2_2 in which the first pressure chamber 330_1 and the sixth pressure chamber 330_6 are driven, and the mode 2_2_3 in which the third pressure chamber 330_3 and the fourth pressure chamber 330_4 are driven. In these modes, the pressure wave can be evenly transmitted to the nozzle from the left and right, and thus the ejection efficiency is high. In particular, the second pressure chamber 330_2 and the fifth pressure chamber 330_5 have the flow path lengths FL2 and FL5 to the nozzle 200 shorter than those of other pressure chambers, and the mode 2_2_1 in which these pressure chambers 330_2 and 330_5 are driven is preferable from the viewpoint that the droplet amount Iv is large. Further, when two or more of the three modes 2_2_1 to 2_2_3 are used, the gradation reproducibility of the dots can be further improved.

As a mode in which the four pressure chambers 330 are driven, it is preferable to use a mode in which the four pressure chambers 330 are driven such that the nozzle 200 is present inside a quadrangle having the centers of the four pressure chambers 330 as the vertices. Specifically, the mode 2_4_1 in which the pressure chambers 330_1, 330_2, 330_5, and 330_6 are driven is preferable. In this mode 2_4_1, the pressure wave can be transmitted substantially evenly from both sides of the nozzle 200. In addition, the mode 2_4_2 in which the pressure chambers 330_1, 330_3, 330_4, and 330_6 are driven and the mode 2_4_3 in which the pressure chambers 330_2, 330_3, 330_4, and 330_5 are driven may be used. When two or more of the three modes 2_4_1 to 2_4_3 are used, the gradation reproducibility of the dots can be further improved.

In addition, a mode in which only the three pressure chambers 330 are driven may be used. As the drive mode, it is preferable to use a mode in which the three pressure chambers 330 are driven such that the nozzles 200 are present inside a triangle having the centers of the three pressure chambers 330 as the vertices. Further, a mode in which only five pressure chambers are driven may be used. As the drive mode, it is preferable to use a mode in which the five pressure chambers 330 are driven such that the nozzles 200 are present inside a pentagon having the centers of the five pressure chambers 330 as the vertices.

Figure 20:
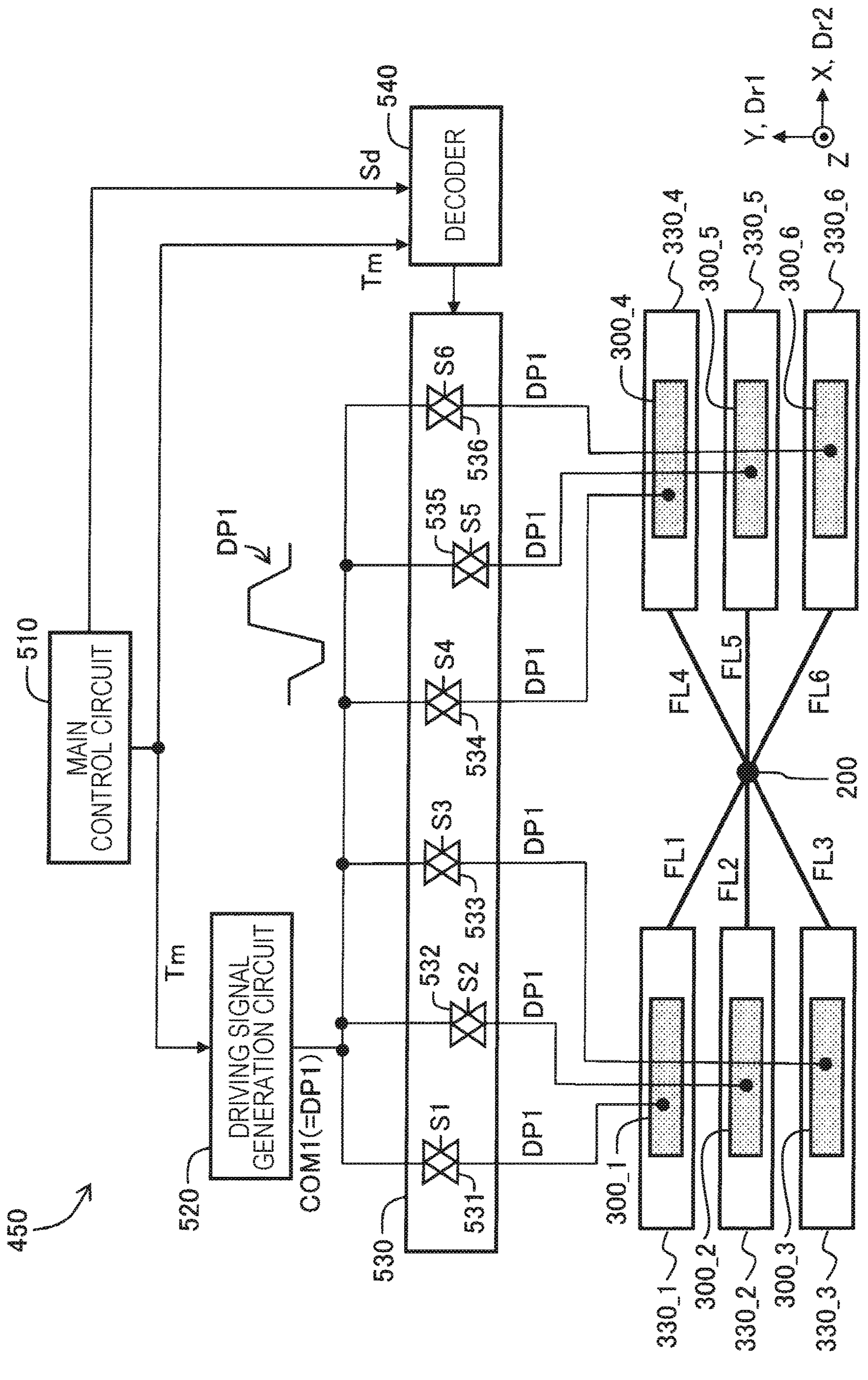
FIG. 20 is an explanatory diagram illustrating a head drive function of a control section according to a fifth embodiment.

FIG. 20 is an explanatory diagram illustrating a head drive function of the control section 450 according to the fifth embodiment. The fifth embodiment is mainly different from the fourth embodiment described above only in the positional relationship between the plurality of pressure chambers 330_1 to 330_6 in plan view in the Z direction, and has other apparatus configurations and control operations, which are substantially the same as those of the first embodiment.

In the fourth embodiment described with reference to FIG. 18, the plurality of pressure chambers 330_1 to 330_6 are arranged in a staggered pattern, but in the fifth embodiment, the plurality of pressure chambers 330_1 to 330_6 are not arranged in a staggered pattern. That is, the first pressure chamber 330_1 and the fourth pressure chamber 330_4 are arranged at the same position with respect to the first direction Dr1. Further, the second pressure chamber 330_2 and the fifth pressure chamber 330_5 are also arranged at the same position in the first direction Dr1, and the third pressure chamber 330_3 and the sixth pressure chamber 330_6 are also arranged at the same position in the first direction Dr1.

In the fifth embodiment, the following formulas are satisfied for the flow path lengths FL1 to FL6 from the six pressure chambers 330_1 to 330_6 to the nozzle 200.

$$FL2<FL1 \quad (5a)$$

$$FL5<FL4 \quad (5b)$$

$$FL1=FL3=FL4=FL6 \quad (5c)$$

$$FL2=FL5 \quad (5d)$$

FIG. 21 is an explanatory diagram illustrating an ejection mode according to the fifth embodiment. The ON/OFF state of the driving element 300 in each mode is the same as the mode of the fourth embodiment illustrated in FIG. 19, but the droplet amount Iv is different from that of the first embodiment. In the example of FIG. 21, the droplet amount Iv has eight different values ranging from 0.5 [pl] to 12 [pl]. When all of these plurality of modes are used, nine gradations can be reproduced at one dot, including gradations without dots. However, the control section 450 may be configured to use only some of these modes.

In the fifth embodiment, it is preferable that the ejection modes used by the control section 450 include a mode in which all six pressure chambers 330_1 to 330_6 are driven, a mode in which only four pressure chambers 330 are driven among the pressure chambers, and a mode in which only two pressure chambers 330 are driven. When these three modes are included, the gradation reproducibility of dots can be improved. In addition, a mode in which only the three pressure chambers 330 are driven or a mode in which only the five pressure chambers are driven may be used.

As a mode for driving only the two pressure chambers 330, it is preferable to use a mode for driving the two pressure chambers 330 on a straight line passing through the nozzle 200. Specifically, it is preferable to use one or more modes out of the mode 2_2_1 in which the second pressure chamber 330_2 and the fifth pressure chamber 330_5 are driven, the mode 2_2_2 in which the first pressure chamber 330_1 and the sixth pressure chamber 330_6 are driven, and the mode 2_2_3 in which the third pressure chamber 330_3 and the fourth pressure chamber 330_4 are driven. In these modes, the pressure wave can be evenly transmitted to the nozzle from the left and right, and thus the ejection efficiency is high. In particular, the second pressure chamber 330_2 and the fifth pressure chamber 330_5 have the flow path lengths FL2 and FL5 to the nozzle 200 shorter than those of other pressure chambers, and the mode 2_2_1 in which these pressure chambers 330_2 and 330_5 are driven is preferable from the viewpoint that the droplet amount Iv is large. Further, when two or more of the three modes 2_2_1 to 2_2_3 are used, the gradation reproducibility of the dots can be further improved.

As a mode in which the four pressure chambers 330 are driven, it is preferable to use a mode in which the four pressure chambers 330 are driven such that the nozzle 200 is present inside a quadrangle having the centers of the four pressure chambers 330 as the vertices. Specifically, the mode 2_4_1 in which the pressure chambers 330_1, 330_2, 330_5, and 330_6 are driven and the mode 2_4_3 in which the pressure chambers 330_2, 330_3, 330_4, and 330_5 are driven are preferable. In these modes 2_4_1 and 2_4_3, the pressure wave can be transmitted substantially evenly from both sides of the nozzle 200. In addition, the mode 2_4_2 in which the pressure chambers 330_1, 330_3, 330_4, and 330_6 are driven may be used. When two or more of the three modes 2_4_1 to 2_4_3 are used, the gradation reproducibility of the dots can be further improved.

Figure 22:
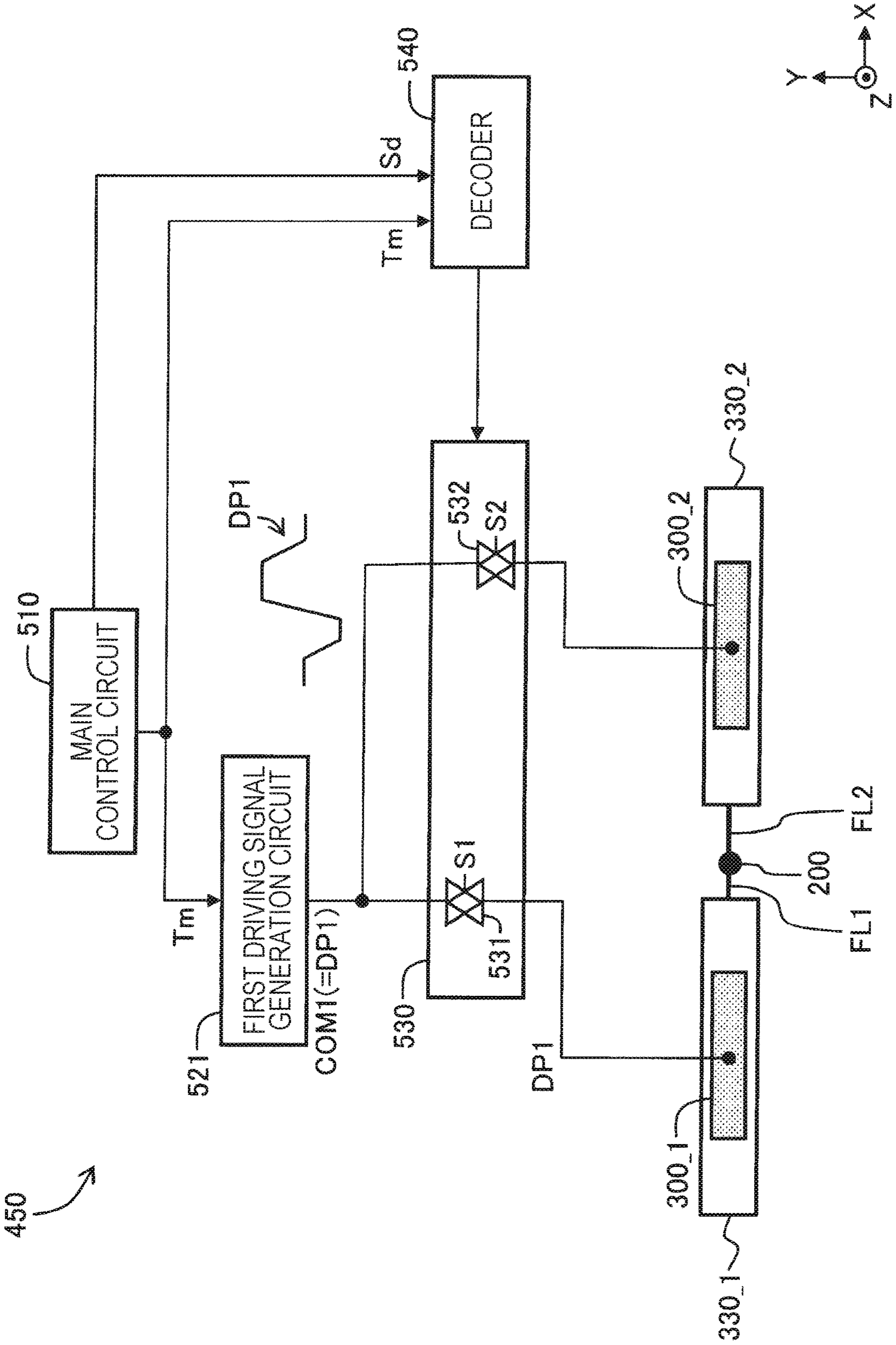
FIG. 22 is an explanatory diagram illustrating a head drive function of a control section according to a sixth embodiment.

FIG. 22 is an explanatory diagram illustrating a head drive function of the control section 450 according to the sixth embodiment. The sixth embodiment is mainly different from the first embodiment described above in that only the two pressure chambers 330_1 and 330_2 are provided, and in that the nozzle 200 is disposed between the two pressure chambers 330_1 and 330_2, and has other apparatus configurations and control operations, which are substantially the same as those of the first embodiment.

In plan view in the Z direction, the two pressure chambers 330_1 and 330_2 extend in the X direction, and the longitudinal directions thereof are parallel to the X direction. Further, the two pressure chambers 330_1 and 330_2 are arranged in the X direction. The nozzle 200 is disposed at a position sandwiched between the two pressure chambers 330_1 and 330_2.

In the sixth embodiment, the flow path length FL1 from the first pressure chamber 330_1 to the nozzle 200 is shorter than the flow path length FL2 from the second pressure chamber 330_2 to the nozzle 200. However, the flow path lengths FL1 and FL2 may be set to be the same. In addition, the position of the nozzle 200 can be set to any position other than the position illustrated in FIG. 22. For example, the nozzle 200 may be disposed at a position overlapping the first pressure chamber 330_1 in plan view in the Z direction. In this case, the first flow path length FL1 substantially corresponds to the flow path length of the communication hole 341 coupled to the first pressure chamber 330_1, and the second flow path length FL2 substantially corresponds to the flow path length obtained by summing the flow path length of the communication hole 342 coupled to the second pressure chamber 330_2 and the flow path length of the communication flow path 350 coupling the communication hole 341 and the communication hole 342.

FIG. 23 is an explanatory diagram illustrating an ejection mode according to the sixth embodiment. In this example, the droplet amount Iv has three different values such as 2.5 [pl], 3.5 [pl], and 6 [pl]. When all of these plurality of modes are used, four gradations can be reproduced at one dot position, including gradations without dots.

In the sixth embodiment, the control section 450 can selectively execute the first ejection mode EM1 in which both of the two driving elements 300_1 and 300_2 are driven to eject a liquid from the nozzle 200, and the second ejection mode EM2 in which only one driving element out of the two driving elements 300_1 and 300_2 are driven to eject a liquid from the nozzle 200. Therefore, the gradation reproducibility of dots can be improved.

In consideration of the various embodiments described above, it is preferable to use an ejection mode having any of the following features.

Feature M8

When the number N of the pressure chambers 330 provided corresponding to one nozzle 200 is any integer of two or more, in a mode in which only two pressure chambers 330 out of N are driven, the two pressure chambers 330 are pressure chambers which are present on a straight line passing through the nozzle 200 and on one side and the other side of the nozzle 200 in plan view in the ejection direction.

In the feature M8, it is more preferable that the centers of the two pressure chambers 330 are on a straight line passing through the nozzle 200.

Feature M9

When the number N of the pressure chambers 330 provided corresponding to one nozzle 200 is any integer of 4 or more and Nd is an odd number of 3 or more and less than N, in a mode in which only Nd pressure chambers 330 out of N are driven, the Nd pressure chambers 330 are pressure chambers in which the nozzle 200 is present inside a Nd-square having the centers of the Nd pressure chambers 330 as the vertices in plan view in the ejection direction.

Feature M10

When the number N of the pressure chambers 330 provided corresponding to one nozzle 200 is any integer of 5 or more and Ne is an even number of 4 or more and less than N, in a mode in which only Ne pressure chambers 330 out of N are driven, the Ne pressure chambers 330 are pressure chambers in which the nozzle 200 is present inside a Ne-square having the centers of the Ne pressure chambers 330 as the vertices in plan view in the ejection direction.

In this feature M10, it is more preferable that the nozzle 200 is at the center of the Ne-square.

By applying one or more of these features M8 to M10, the ejection efficiency can be improved.

Modification Example 1

In each of the above-described aspects, the serial type liquid ejecting apparatus 400 that reciprocates the carriage 434 holding the liquid ejecting head 100 is exemplified. However, the present disclosure can also be applied to a line type liquid ejecting apparatus in which the plurality of nozzles 200 are distributed over the entire width of the medium PM. That is, the carriage that holds the liquid ejecting head 100 is not limited to a serial type carriage, and may be a structure that supports the liquid ejecting head 100 in a line type. In this case, for example, the plurality of liquid ejecting heads 100 are arranged side by side in the width direction of the medium PM, and the plurality of liquid ejecting heads 100 are collectively held by one carriage.

Modification Example 2

In each of the above-described aspects, the liquid ejecting apparatus 400 including the circulation mechanism 60 is exemplified. However, the liquid ejecting apparatus 400 may not include the circulation mechanism 60. That is, both the opening portions 161 and 162 of the housing section 160 are inlets for introducing the liquid from the liquid storage section 420, and both the first common liquid chamber 110 and the second common liquid chamber 120 may be used as flow paths for supplying the liquid supplied from the liquid storage section 420 to the nozzle 200.

Modification Example 3

In each of the above-described aspects, two, four, and six pressure chambers 330 are provided corresponding to one nozzle. However, an odd number (three, five, seven or the like) of pressure chambers 330 may be provided corresponding to one nozzle. Further, eight or more pressure chambers 330 may be provided corresponding to one nozzle.

Modification Example 4

In each of the above-described aspects, one coupling flow path 320 is coupled to each of the pressure chambers 331 to 334. However, the common coupling flow path 320 may be provided for the pressure chambers 331 and 332 coupled to the same first common liquid chamber 110. In other words, one coupling flow path 320 may be provided corresponding to the plurality of pressure chambers 330. The same applies to pressure chambers 333 and 334 coupled to the same second common liquid chamber 120. When considering four individual flow paths corresponding to the individual pressure chambers 331 to 334 in Modification example 4, for example, the first individual flow path does not include the coupling flow path 320. The second to fourth individual flow paths can also be grasped in the same manner.

Modification Example 5

In each of the above-described aspects, the coupling flow path 320 is a flow path extending in the Z direction. However, the coupling flow path 320 may be a flow path extending in a direction intersecting the Z direction, and may be a flow path including both a part extending in the Z direction and a part extending in a direction intersecting the Z direction.

Modification Example 6

The liquid ejecting apparatus exemplified in the above-described aspects can be adopted in various devices such as a facsimile machine and a copier, in addition to a device dedicated to printing. However, the application of the liquid ejecting apparatus is not limited to printing. For example, a liquid ejecting apparatus that ejects a solution of a coloring material is used as a manufacturing device for forming a color filter of a display device such as a liquid crystal display panel. Further, the liquid ejecting apparatus that ejects a solution of a conductive material is used as a manufacturing device for forming wiring or electrodes on the wiring substrate. Further, a liquid ejecting apparatus that ejects a solution of an organic substance related to a living body is used, for example, as a manufacturing device for manufacturing a biochip.

Other Aspects

The present disclosure is not limited to the above-described embodiments and can be implemented with various aspects without departing from the spirit thereof. For example, the present disclosure can also be implemented in the following aspects. For example, the technical features in the aspects corresponding to the technical features in each aspect described below are to solve some or all of the above-described problems, or in order to achieve some or all of the above-described effects, replacement or combination can be performed as appropriate. Unless the technical features are described as essential in the present specification, deletion is possible as appropriate.

1. The liquid ejecting apparatus according to a first aspect of the present disclosure includes a nozzle for ejecting a liquid, first to fourth pressure chambers communicating with the nozzle, first to fourth driving elements provided corresponding to each of the first to fourth pressure chambers, and a control section that controls the first to fourth driving elements. The control section is configured to execute a first ejection mode in which all of the first to fourth driving elements are driven to eject a liquid from the nozzle, and a second ejection mode in which only some driving elements among the first to fourth driving elements are driven to eject a liquid from the nozzle.

According to this liquid ejecting apparatus, the gradation reproducibility of dots can be improved.

2. In the liquid ejecting apparatus, the second ejection mode may include a mode in which only two driving elements among the first to fourth driving elements are driven to eject a liquid from the nozzle, and a mode in which only two driving elements different from the two driving elements among the first to fourth driving elements are driven to eject a liquid from the nozzle.

According to this liquid ejecting apparatus, the life of the driving element can be extended.

3. In the liquid ejecting apparatus, a flow path length from the first pressure chamber to the nozzle, a flow path length from the second pressure chamber to the nozzle, a flow path length from the third pressure chamber to the nozzle, and a flow path length from the fourth pressure chamber to the nozzle may be the same.

According to this liquid ejecting apparatus, the ejection amounts in the two modes can be made uniform.

4. In the liquid ejecting apparatus, a driving pulse supplied to each of the first to fourth driving elements in the first ejection mode, and a driving pulse supplied to each of the some driving elements among the first to fourth driving elements in the second ejection mode may be the same.

According to this liquid ejecting apparatus, high gradation reproducibility can be expressed even with the same waveform, and thus the configuration of the driving signal generation circuit can be simplified.

5. In the liquid ejecting apparatus, the second ejection mode may include a partial drive mode in which only two driving elements among the first to fourth driving elements are driven to eject a liquid from the nozzle.

6. In the liquid ejecting apparatus, the partial drive mode may include a mode in which only two driving elements corresponding to two pressure chambers having a flow path length to the nozzle shorter than those of the other pressure chambers among the first to fourth pressure chambers are driven to eject a liquid from the nozzle.

According to this liquid ejecting apparatus, the ejection efficiency is good.

7. In the liquid ejecting apparatus, the partial drive mode may include a mode in which two driving elements corresponding to two pressure chambers positioned on a diagonal line of a quadrangle having centers of each of the first to fourth pressure chambers as vertices are driven to eject a liquid from the nozzle when viewed in an ejection direction in which the nozzle ejects a liquid.

According to this liquid ejecting apparatus, the ejection efficiency is good.

8. In the liquid ejecting apparatus, the first pressure chamber and the second pressure chamber may be arranged side by side in a first direction orthogonal to an ejection direction in which the nozzle ejects a liquid, and the third pressure chamber and the fourth pressure chamber may be arranged side by side in the first direction. The first and second pressure chambers and the third and fourth pressure chambers may be arranged to be shifted from each other in both the first direction and a second direction orthogonal to the first direction, a flow path length from the first pressure chamber to the nozzle may be shorter than a flow path length from the second pressure chamber to the nozzle, and a flow path length from the fourth pressure chamber to the nozzle may be shorter than a flow path length from the third pressure chamber to the nozzle. The second ejection mode may include a mode in which only the first driving element and the fourth driving element are driven to eject a liquid from the nozzle.

According to this liquid ejecting apparatus, the flow path lengths to the nozzles are the same, and the ejection is performed by the pressure waves from the two pressure chambers positioned at positions facing each other with the nozzle therebetween, and thus the second ejection mode with a less energy loss can be executed.

9. In the liquid ejecting apparatus, a first common liquid chamber communicating with the first and second pressure chambers, and a second common liquid chamber communicating with the third and fourth pressure chambers, may further be provided.

10. In the liquid ejecting apparatus, the first common liquid chamber may be a flow path for supplying a liquid to the first and second pressure chambers, and the second common liquid chamber may be a flow path for collecting a liquid from the third and fourth pressure chambers.

11. In the liquid ejecting apparatus, the second ejection mode may include a mode in which only one driving element out of the first driving element and the second driving element is driven, and only one driving element out of the third driving element and the fourth driving element is driven to eject a liquid from the nozzle.

According to this liquid ejecting apparatus, the ejection efficiency is good.

12. In the liquid ejecting apparatus, a nozzle array configured by arranging a plurality of nozzles including the nozzle in a first direction orthogonal to an ejection direction in which the nozzle ejects a liquid, may further be provided, the first and second pressure chambers may be arranged on one side of a second direction orthogonal to both of the first direction and the ejection direction with respect to the nozzle array, and the third and fourth pressure chambers may be arranged on the other side of the second direction with respect to the nozzle array. The second ejection mode may include a mode in which only one driving element out of the first driving element and the second driving element may be driven, and only one driving element out of the third driving element and the fourth driving element may be driven to eject a liquid from the nozzle.

According to this liquid ejecting apparatus, the ejection efficiency is good.

13. In the liquid ejecting apparatus, a communication flow path coupled to the nozzle and communicating between the nozzle and the first to fourth pressure chambers, may further be provided, and the communication flow path may have a longer dimension in the second direction than a dimension in the first direction.

According to this liquid ejecting apparatus, since the communication flow path is long along the second direction, the pressure waves transmitted from one side and the other side in the second direction in the vicinity of the nozzle can be combined when the drive mode described above is performed. As a result, the ejection efficiency is improved.

14. In the liquid ejecting apparatus, the control section may execute only the first ejection mode when a low image quality mode is selected as an image quality mode relating to an image quality of an image recorded on a medium by ejection of the liquid, and execute only the second ejection mode or both of the first ejection mode and the second ejection mode when a high image quality mode in which an image quality is higher than that in the low image quality mode is selected.

According to this liquid ejecting apparatus, printing with an emphasis on printing speed and printing with an emphasis on gradation reproducibility can be selectively executed.

15. In the liquid ejecting apparatus, the control section may execute the first ejection mode when a viscosity of the liquid is a first value, and execute the second ejection mode when a viscosity of the liquid is a second value lower than the first value.

According to this liquid ejecting apparatus, it is possible to reduce the power consumption by switching the ejection mode according to the state of the viscosity.

16. In the liquid ejecting apparatus, the control section may execute the first ejection mode when a distance between the nozzle and a medium receiving the liquid ejected from the nozzle is a first distance, and execute only the second ejection mode or both of the first ejection mode and the second ejection mode when a distance between the nozzle and the medium is a second distance shorter than the first distance.

According to this liquid ejecting apparatus, since the second ejection mode has a less droplet amount than the first ejection mode, a large distance between the medium and the nozzle is easily affected by the air flow, but by appropriately switching the mode according to the distance, it is possible to suppress printing defects due to the influence of the air flow.

17. In the liquid ejecting apparatus, an input receiving section that receives an input of a mode selected by a user from a plurality of modes including the first ejection mode and the second ejection mode, may further be provided.

According to this liquid ejecting apparatus, the user can select the mode the user wants to use.

18. In the liquid ejecting apparatus, the second ejection mode may include a mode in which only one driving element among the first to fourth driving elements is driven to eject a liquid from the nozzle.

According to this liquid ejecting apparatus, the gradation reproducibility can be improved.

19. In the liquid ejecting apparatus, the second ejection mode may include a mode in which only three driving elements among the first to fourth driving elements are driven to eject a liquid from the nozzle.

According to this liquid ejecting apparatus, the gradation reproducibility can be improved.

20. A liquid ejecting apparatus according to a second aspect of the present disclosure includes a nozzle for ejecting a liquid, a plurality of pressure chambers communicating with the nozzle, a plurality of driving elements provided corresponding to each of the plurality of pressure chambers, and a control section that controls the plurality of driving elements. The control section is configured to execute a first ejection mode in which all of the plurality of driving elements are driven to eject a liquid from the nozzle, and a second ejection mode in which only some driving elements among the plurality of driving elements are driven to eject a liquid from the nozzle.

According to this liquid ejecting apparatus, the gradation reproducibility can be improved.

The present disclosure can also be implemented in various aspects other than the driving method of a liquid ejecting head and the liquid ejecting apparatus. For example, the present disclosure can be implemented in the aspect of a method for manufacturing a liquid ejecting head and a liquid ejecting apparatus, a method for controlling the liquid ejecting head and the liquid ejecting apparatus, a computer program for implementing the control method, and a non-temporary recording medium that records the computer program.

What is claimed is:

1. A liquid ejecting apparatus comprising:

a nozzle for ejecting a liquid;

first to fourth pressure chambers communicating with the nozzle;

first to fourth driving elements, each of the first to fourth driving elements provided to correspond to one of the first to fourth pressure chambers; and a control section that controls the first to fourth driving elements, the control section in communication with a non-transitory medium storing instructions that include a first ejection mode and a second ejection mode, wherein the control section is configured to access the non-transitory medium to execute the first ejection mode in which all of the first to fourth driving elements are driven to eject the liquid from the nozzle, and the second ejection mode in which only some driving elements among the first to fourth driving elements are driven to eject the liquid from the nozzle, wherein the second ejection mode includes a partial drive mode in which only two driving elements among the first to fourth driving elements are driven to eject the liquid from the nozzle, and the partial drive mode includes a mode in which only two driving elements corresponding to two pressure chambers having a flow path length to the nozzle shorter than those of the other pressure chambers among the first to fourth pressure chambers are driven to eject the liquid from the nozzle.

2. The liquid ejecting apparatus according to claim 1, wherein the second ejection mode includes a first mode in which only two driving elements among the first to fourth driving elements are driven to eject the liquid from the nozzle, and a second mode in which only two driving elements different from the two driving elements among the first to fourth driving elements are driven to eject the liquid from the nozzle.

3. The liquid ejecting apparatus according to claim 2, wherein a flow path length from the first pressure chamber to the nozzle, a flow path length from the second pressure chamber to the nozzle, a flow path length from a third pressure chamber of the first to fourth pressure chambers to the nozzle, and a flow path length from the fourth pressure chamber to the nozzle are the same.

4. The liquid ejecting apparatus according to claim 1, wherein a driving pulse supplied to each of the first to fourth driving elements in the first ejection mode, and the driving pulse supplied to each of some of a plurality of driving elements among the first to fourth driving elements in the second ejection mode are the same.

5. The liquid ejecting apparatus according to claim 1, wherein the partial drive mode includes a mode in which two driving elements corresponding to two pressure chambers of the first to fourth pressure chambers that are positioned on a diagonal line of a quadrangle having as vertices centers of each of the first to fourth pressure chambers, when viewed in an ejection direction in which the nozzle ejects a liquid, are driven to eject the liquid from the nozzle.

6. The liquid ejecting apparatus according to claim 1, wherein the first pressure chamber and the second pressure chamber are arranged side by side in a first direction orthogonal to an ejection direction in which the nozzle ejects the liquid, and a third pressure chamber and the fourth pressure chamber are arranged side by side in the first direction, the first and second pressure chambers and the third and fourth pressure chambers are arranged to be shifted from each other in both the first direction and a second direction orthogonal to the first direction, a flow path length from the first pressure chamber to the nozzle is shorter than a flow path length from the second pressure chamber to the nozzle, a flow path length from the fourth pressure chamber to the nozzle is shorter than a flow path length from the third pressure chamber to the nozzle, and the second ejection mode includes a mode in which only the first driving element and the fourth driving element are driven to eject the liquid from the nozzle.

7. The liquid ejecting apparatus according to claim 1, further comprising:

a first common liquid chamber communicating with the first and second pressure chambers; and a second common liquid chamber communicating with the third and fourth pressure chambers.

8. The liquid ejecting apparatus according to claim 7, wherein the first common liquid chamber is a flow path for supplying the liquid to the first and second pressure chambers, and the second common liquid chamber is a flow path for collecting the liquid from the third and fourth pressure chambers.

9. The liquid ejecting apparatus according to claim 7, wherein the second ejection mode includes a mode in which only one of the first driving element and the second driving element and one of a third driving element and the fourth driving element are driven to eject the liquid from the nozzle.

10. The liquid ejecting apparatus according to claim 1, further comprising:

a nozzle array configured by arranging a plurality of nozzles including the nozzle in a first direction orthogonal to an ejection direction in which the nozzle ejects the liquid, wherein the first and second pressure chambers are arranged on one side of a second direction orthogonal to both of the first direction and the ejection direction with respect to the nozzle array, the third and fourth pressure chambers are arranged on the other side of the second direction with respect to the nozzle array, and the second ejection mode includes a mode in which only one of the first driving element and the second driving element and one of the third driving element and the fourth driving element are driven to eject the liquid from the nozzle.

11. The liquid ejecting apparatus according to claim 10, further comprising:

a communication flow path coupled to the nozzle and communicating between the nozzle and the first to fourth pressure chambers, wherein the communication flow path has a longer dimension in the second direction than a dimension in the first direction.

12. The liquid ejecting apparatus according to claim 1, wherein the control section executes only the first ejection mode when a low image quality mode is selected as an image quality mode relating to an image quality of an image recorded on a medium by ejection of the liquid, and executes only the second ejection mode or both of the first ejection mode and the second ejection mode when a high image quality mode in which an image quality is higher than that in the low image quality mode is selected.

13. The liquid ejecting apparatus according to claim 1, wherein the control section executes the first ejection mode when a viscosity of the liquid is a first value, and executes the second ejection mode when a viscosity of the liquid is a second value lower than the first value.

14. The liquid ejecting apparatus according to claim 1, wherein the control section executes the first ejection mode when a distance between the nozzle and a medium receiving the liquid ejected from the nozzle is a first distance, and executes only the second ejection mode or both of the first ejection mode and the second ejection mode when a distance between the nozzle and the medium is a second distance shorter than the first distance.

15. The liquid ejecting apparatus according to claim 1, further comprising:

an input receiving section that receives an input of a mode selected by a user from a plurality of modes including the first ejection mode and the second ejection mode.

16. The liquid ejecting apparatus according to claim 1, wherein the second ejection mode includes a first mode in which the only some driving elements among the first to fourth driving elements is only one driving element among the first to fourth driving elements that is driven to eject the liquid from the nozzle.

17. The liquid ejecting apparatus according to claim 1, wherein the second ejection mode includes a mode in which only three driving elements among the first to fourth driving elements are driven to eject the liquid from the nozzle.

* * * * *